(12) United States Patent
Kataoka

(10) Patent No.: US 8,742,906 B2
(45) Date of Patent: Jun. 3, 2014

(54) ALARM OUTPUT CONTROL APPARATUS

(75) Inventor: Hiroaki Kataoka, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 248 days.

(21) Appl. No.: 13/260,090

(22) PCT Filed: Apr. 15, 2009

(86) PCT No.: PCT/JP2009/001740
§ 371 (c)(1),
(2), (4) Date: Sep. 23, 2011

(87) PCT Pub. No.: WO2010/119481
PCT Pub. Date: Oct. 21, 2010

(65) Prior Publication Data
US 2012/0019375 A1    Jan. 26, 2012

(51) Int. Cl.
*B60Q 1/00*    (2006.01)
(52) U.S. Cl.
USPC .................................. 340/425.5; 340/465
(58) Field of Classification Search
None
See application file for complete search history.

(56) References Cited

U.S. PATENT DOCUMENTS

| | | | |
|---|---|---|---|
| 6,057,754 A | 5/2000 | Kinoshita et al. | |
| 2003/0120414 A1* | 6/2003 | Matsumoto et al. | 701/96 |
| 2005/0099279 A1* | 5/2005 | Forbes et al. | 340/435 |
| 2009/0284361 A1* | 11/2009 | Boddie et al. | 340/439 |

FOREIGN PATENT DOCUMENTS

| | | |
|---|---|---|
| JP | 61 21853 | 1/1986 |
| JP | 5 054291 | 3/1993 |
| JP | 9 254803 | 9/1997 |
| JP | 11 66494 | 3/1999 |
| JP | 11 222050 | 8/1999 |
| JP | 2001 341599 | 12/2001 |
| JP | 2004 34792 | 2/2004 |
| JP | 2004 246631 | 9/2004 |
| JP | 2008 97501 | 4/2008 |

OTHER PUBLICATIONS

International Search Report Issued Jun. 16, 2009 in PCT/JP09/001740 Filed Apr. 15, 2009.
International Preliminary Report on Patentability Issued Jan. 6, 2011 in PCT/JP09/001740 Filed Apr. 15, 2009.

* cited by examiner

*Primary Examiner* — Brian Zimmerman
*Assistant Examiner* — Kevin Lau
(74) *Attorney, Agent, or Firm* — Oblon, Spivak, McClelland, Maier & Neustadt, L.L.P.

(57) ABSTRACT

An output adjustment ECU includes: a request reception section for receiving an output request of alarm information to a driver from a drive assist ECU; a usefulness determination section for, when the request reception section receives the output request, determining whether or not outputting first alarm information that is the alarm information of which the output request is received is useful for the driver; a content modification section for, when the usefulness determination section determines that the outputting is not useful, modifying a content of the first alarm information to generate second alarm information that is alarm information useful for the driver; and an output execution section for outputting the first alarm information when the usefulness determination section determines that the outputting is useful, and outputting the second alarm information when the usefulness determination section determines that the outputting is not useful. In this manner, appropriate alarm information is outputted.

17 Claims, 15 Drawing Sheets

F I G. 8
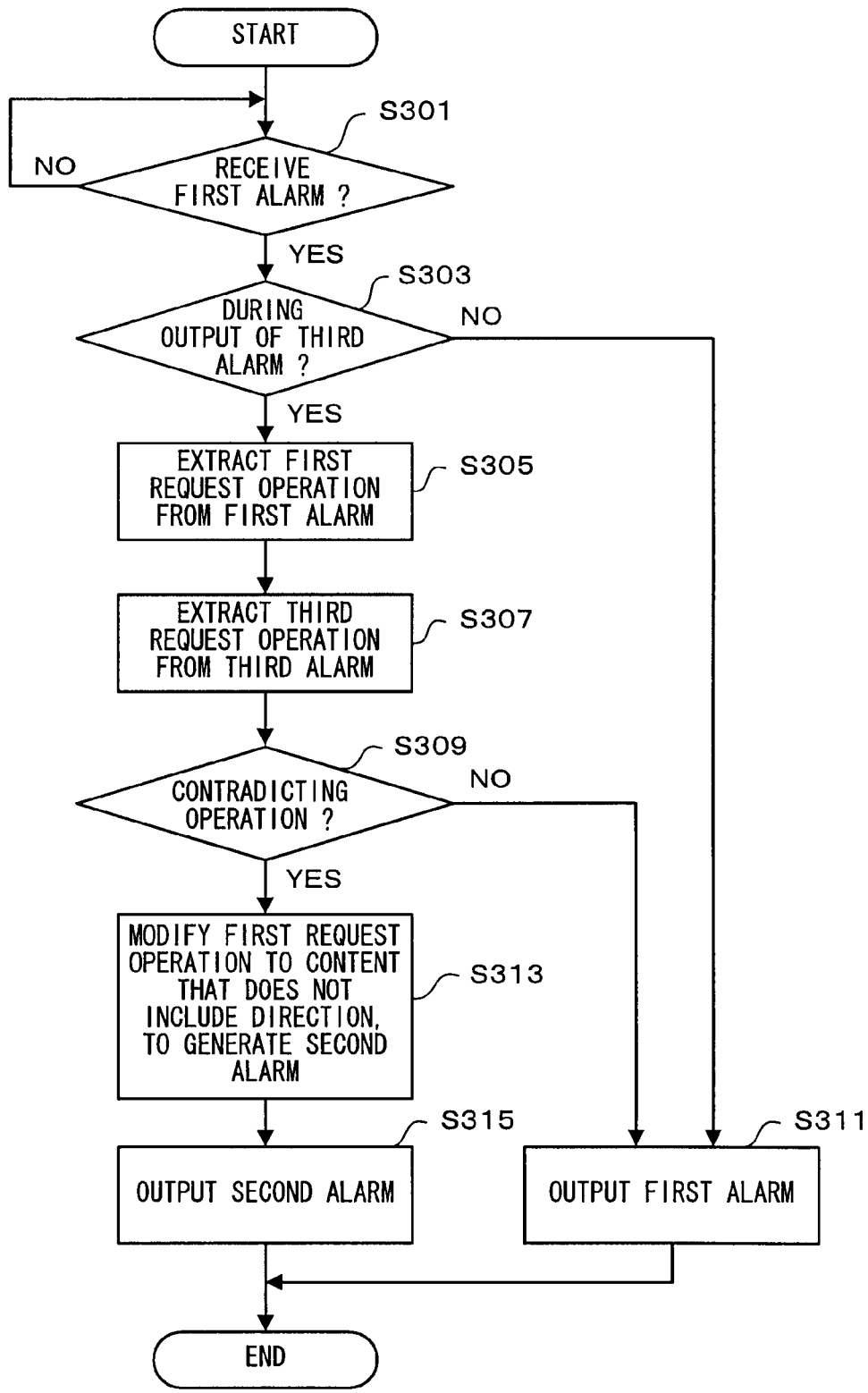

ALARM OUTPUT CONTROL APPARATUS

TECHNICAL FIELD

The present invention relates to, for example, an alarm output control apparatus that is mounted in a vehicle and that controls output of alarm information from at least one drive assist apparatus to a driver.

BACKGROUND ART

In order to improve driver's safety, driver's convenience, and the like, informing a driver of drive assist information such as information on a traveling state of a vehicle, such as information on an obstacle present in front such as a vehicle, whether or not a vehicle speed is appropriate, and whether or not there is the possibility that a deviation from a lane will occur, via a voice, an image, or the like, is proposed. This allows the driver to be caused to take an avoidance action from a risky event such as collision. However, drive assist information that should be informed to the driver is wide-ranging information, and thus there is the possibility that a situation will occur where a plurality of items of drive assist information are simultaneously informed to the driver and it is difficult for the driver to identify them.

Various methods, apparatuses, and the like, for solving the above problem, are disclosed (e.g., see Patent Literature 1). In a drive assist information providing method described in Patent Literature 1, drive assist information is classified on the basis of urgency, and in the same class, an event having a shortest predicted time before an alarm target event occurs is preferentially provided to a driver. According to the method, information having highest urgency can preferentially be provided to the driver. Thus, also in a situation where a plurality of items of drive assist information should simultaneously be provided, the most important information is provided, whereby drive assist information is allowed to be provided in such a manner that it is easy for the driver to identify the drive assist information.

[PTL 1] Japanese Laid-Open Patent Publication No. 2004-246631

DISCLOSURE OF THE INVENTION

Problems to be Solved by the Invention

However, in the drive assist information providing method described in Patent Literature 1, there is the possibility that information having low urgency will not be informed to the driver, but there is information that is information having low urgency but should be notified to the driver. In addition, there is also a demand that drive assist information should be provided to a driver as much as possible in such a range that it is not difficult for the driver to identify the drive assist information.

The present invention is made in view of the circumstances described above, and an object of the present invention is to provide an alarm output control apparatus capable of outputting appropriate alarm information.

Solution to the Problems

In order to attain the object mentioned above, the present invention has the following features. A first aspect of the present invention is an alarm output control apparatus that is mounted in a vehicle and that controls output of alarm information from at least one drive assist apparatus to a driver. The alarm output control apparatus includes: a request reception unit for receiving an output request of the alarm information from the drive assist apparatus; a usefulness determination unit for, when the request reception unit receives the output request, determining whether or not outputting first alarm information that is the alarm information of which the output request is received is useful for the driver; a content modification unit for, when the usefulness determination unit determines that the outputting is not useful, modifying a content of the first alarm information to generate second alarm information that is alarm information useful for the driver; and an output execution unit for outputting the first alarm information when the usefulness determination unit determines that the outputting is useful, and outputting the second alarm information when the usefulness determination unit determines that the outputting is not useful.

In a second aspect of the present invention based on the first aspect, the usefulness determination unit determines whether or not the outputting is useful, on the basis of a content of a driving operation of the driver.

In a third aspect of the present invention based on the second aspect, the usefulness determination unit determines that the outputting is not useful, when a first request operation that is included in the first alarm information and that is an operation for making a request to the driver contradicts the driving operation of the driver.

In a fourth aspect of the present invention based on the third aspect, the usefulness determination unit determines that the outputting is not useful, when a type of influence of the first request operation on a traveling state of the vehicle is the same as a type of influence of the driving operation on the traveling state of the vehicle; and a direction of the influence of the first request operation on the traveling state of the vehicle is opposite to a direction of the influence of the driving operation on the traveling state of the vehicle.

In a fifth aspect of the present invention based on the second aspect, the driving operation includes at least either one of a steering operation or an acceleration/deceleration operation.

In a sixth aspect of the present invention based on the first aspect, the usefulness determination unit determines whether or not the outputting is useful, on the basis of third alarm information that is other alarm information being outputted.

In a seventh aspect of the present invention based on the sixth aspect, the usefulness determination unit determines whether or not the outputting is useful, on the basis of a third request operation that is included in the third alarm information and that is an operation for making a request to the driver.

In an eighth aspect of the present invention based on the seventh aspect, the usefulness determination unit determines that the outputting is not useful, when a first request operation that is included in the first alarm information and that is an operation for making a request to the driver contradicts the third request operation.

In a ninth aspect of the present invention based on the eighth aspect, the usefulness determination unit determines that the outputting is not useful, when a type of influence of the first request operation on a traveling state of the vehicle is the same as a type of influence of the third request operation on the traveling state of the vehicle; and a direction of the influence of the first request operation on the traveling state of the vehicle is opposite to a direction of the influence of the third request operation on the traveling state of the vehicle.

In a tenth aspect of the present invention based on the seventh aspect, the third request operation includes at least either one of a steering operation or an acceleration/deceleration operation.

In an eleventh aspect of the present invention based on any one of the first aspect, the second aspect, and the sixth aspect, the content modification unit modifies the content of the first alarm information to a content that a first request operation that is included in the first alarm information and that is an operation for making a request to the driver is not to be outputted, to generate the second alarm information.

In a twelfth aspect of the present invention based on the eleventh aspect, the content modification unit modifies the first request operation that is included in the first alarm information and that is the operation for making a request to the driver, to information that a driving state is notified to the driver, to generate the second alarm information.

In a thirteenth aspect of the present invention based on the eleventh aspect, the first request operation includes at least either one of a steering operation or an acceleration/deceleration operation.

In a fourteenth aspect of the present invention based on any one of the first aspect, the second aspect, and the sixth aspect, the content modification unit modifies a content of a first request operation that is included in the first alarm information and that is an operation for making a request to the driver, to a content that does not include a direction of influence of the first request operation on a traveling state of the vehicle, to generate the second alarm information.

In a fifteenth aspect of the present invention based on the fourteenth aspect, the first request operation includes at least either one of a steering operation or an acceleration/deceleration operation.

In a sixteenth aspect of the present invention based on any one of the first aspect, the second aspect, and the sixth aspect, the output execution unit outputs the first alarm information and the second alarm information via at least one of audio information, character information, and image information.

In a seventeenth aspect of the present invention based on any one of the first aspect, the second aspect, and the sixth aspect, the output execution unit outputs the first alarm information and the second alarm information via provision of vibrations to at least either one of the driver or an operation unit operated by the driver.

In an eighteenth aspect of the present invention based on the seventeenth aspect, the operation unit operated by the driver includes a steering wheel.

In a nineteenth aspect of the present invention based on any one of the first aspect, the second aspect, and the sixth aspect, the output execution unit outputs the first alarm information and the second alarm information via provision of a force to an operation unit operated by the driver.

In a twentieth aspect of the present invention based on the nineteenth aspect, the operation unit operated by the driver includes a steering wheel.

In a twenty-first aspect of the present invention based on the first aspect, the drive assist apparatus includes at least one drive assist apparatus among a drive assist apparatus for preventing a deviation from a driving lane, a drive assist apparatus for ensuring an inter-vehicle distance from a preceding vehicle, an alarm output control apparatus for preventing an excess over a previously-set upper limit vehicle speed, a drive assist apparatus for preventing a collision with an object in front, a drive assist apparatus for preventing an approach to a rear-lateral vehicle during lane change, a drive assist apparatus for preventing decrease in vehicle speed that is caused by change of an inclination of a road surface, a drive assist apparatus for reducing a risk caused by an error of recognizing a stop sign, a drive assist apparatus for prompting deceleration corresponding to a curve curvature of a road in front, and a drive assist apparatus for reducing a risk caused by an error of recognizing a red light.

Advantageous Effects of the Invention

According to the first aspect, the output request of the alarm information is received from the at least one drive assist apparatus. In addition, when the output request is received, it is determined whether or not outputting the first alarm information that is the alarm information of which the output request is received is useful for the driver. Further, when it is determined that the outputting is not useful, the content of the first alarm information is modified to generate the second alarm information that is the alarm information useful for the driver. Moreover, when it is determined that the outputting is useful, the first alarm information is outputted, and when it is determined that the outputting is not useful, the second alarm information is outputted. Therefore, appropriate alarm information can be outputted.

In other words, when it is determined that the first alarm information that is the alarm information of which the output request is received is not useful for the driver, the content of the first alarm information is modified to generate the second alarm information that is the alarm information useful for the driver, and the second alarm information is outputted. Thus, alarm information that is not useful for the driver is not outputted, and hence appropriate alarm information can be outputted.

Specifically, for example, when the driver performs rightward steering in order to overtake a vehicle in front, provision of a steering torque in the leftward direction for prompting leftward steering by the drive assist apparatus for preventing a deviation from a driving lane, in order to prevent a deviation from a lane in the rightward direction, is not an alarm useful for the driver. Therefore, in such a case, it is determined that the outputting is not useful for the driver, the content of the alarm is modified to generate the second alarm information (e.g., alarm information in which provision of a steering torque in the leftward direction is inhibited) that is alarm information useful for the driver, and the second alarm information is outputted. Thus, appropriate alarm information can be outputted.

According to the second aspect, on the basis of the content of the driving operation of the driver, it is determined whether or not the outputting is useful. Therefore, it can appropriately be determined whether or not the first alarm information is useful for the driver.

In other words, for example, when the first alarm information that is the alarm information of which the output request is received disturbs a driving operation performed intentionally by the driver; and safety is not reduced due to the first alarm information not being outputted, it is appropriately determined that the first alarm information is not useful for the driver.

Specifically, for example, when the driver performs rightward steering in order to overtake a vehicle in front, provision of a steering torque in the leftward direction for prompting leftward steering by the drive assist apparatus for preventing a deviation from a driving lane, in order to prevent a deviation from a lane in the rightward direction, is not an alarm useful for the driver. Therefore, in such a case, on the basis of the content of the driving operation (=rightward steering) of the driver, it is appropriately determined that the first alarm information is not useful for the driver.

According to the third aspect, when the first request operation that is included in the first alarm information and that is the operation for making a request to the driver contradicts the driving operation of the driver, it is determined that the outputting is not useful. Therefore, it can further appropriately be determined whether or not the first alarm information is useful for the driver.

In other words, for example, when the first request operation that is included in the alarm information of which the output request is received and that is the operation for making a request to the driver contradicts a driving operation performed intentionally by the driver; and safety is not reduced due to the content of the first request operation not being outputted, it is appropriately determined that the first alarm information including the first request operation is not useful for the driver.

Specifically, for example, when the driver performs rightward steering in order to overtake a vehicle in front, provision of a steering torque in the leftward direction for prompting leftward steering (=first request operation) by the drive assist apparatus for preventing a deviation from a driving lane, in order to prevent a deviation from a lane in the rightward direction, is not an alarm useful for the driver. Therefore, in such a case, the first request operation (here, leftward steering) that is included in the first alarm information and that is the operation for making a request to the driver contradicts the driving operation (=rightward steering) of the driver, and hence it is appropriately determined that the first alarm information is not useful for the driver.

According to the fourth aspect, when the type of the influence of the first request operation on the traveling state of the vehicle is the same as the type of the influence of the driving operation on the traveling state of the vehicle; and the direction of the influence of the first request operation on the traveling state of the vehicle is opposite to the direction of the influence of the driving operation on the traveling state of the vehicle, it is determined that the outputting is not useful. Therefore, it can further appropriately be determined whether or not the first alarm information is useful for the driver.

In other words, when the type of the influence of the first request operation on the traveling state of the vehicle is the same as the type of the influence of the driving operation on the traveling state of the vehicle; and the direction of the influence of the first request operation on the traveling state of the vehicle is opposite to the direction of the influence of the driving operation on the traveling state of the vehicle, the first request operation contradicts the driving operation of the driver. Thus, it can appropriately be determined that the first alarm information is not useful for the driver.

Specifically, for example, rightward steering and leftward steering are operations that contradict each other. In this case, the type of the influence on the traveling state of the vehicle is change of the traveling direction of the vehicle. In addition, for example, depression of an accelerator pedal (=acceleration operation) and depression of a brake pedal (=deceleration operation) are operations that contradict each other. In this case, the type of the influence on the traveling state of the vehicle is change of the speed of the vehicle.

According to the fifth aspect, the driving operation includes at least either one of the steering operation or the acceleration/deceleration operation. Thus, when the first alarm information is an important alarm, it can appropriately be determined whether or not the first alarm information is useful for the driver.

In other words, when the first alarm information is an important alarm, the first alarm information often includes information prompting the driver to perform a steering operation or an acceleration/deceleration operation. Thus, when the first alarm information is an important alarm, it can appropriately be determined whether or not the first alarm information is useful for the driver.

According to the sixth aspect, on the basis of the third alarm information that is the other alarm information being outputted, it is determined whether or not the outputting is useful. Therefore, it can appropriately be determined whether or not the first alarm information is useful for the driver.

In other words, for example, when the first alarm information that is the alarm information of which the output request is received requests the driver to perform an operation that contradicts the third alarm information that is the other alarm information being outputted; and safety is not reduced due to the first alarm information not being outputted, it is appropriately determined that the first alarm information is not useful for the driver.

Specifically, for example, when leftward steering is performed by the drive assist apparatus for avoiding a collision with an object in front, provision of a steering torque in the rightward direction for prompting rightward steering by the drive assist apparatus for preventing an approach to a rear-lateral vehicle during lane change, in order to prevent an approach to a rear vehicle traveling in the left side lane, is not an alarm useful for the driver. Therefore, in such a case, on the basis of the third alarm information (=information prompting leftward steering) that is the other alarm information being outputted, it is appropriately determined that the first alarm information (=information prompting rightward steering) is not useful for the driver.

According to the seventh aspect, on the basis of the third request operation that is included in the third alarm information and that is the operation for making a request to the driver, it is determined whether or not it is useful. Therefore, it can further appropriately be determined whether or not the first alarm information is useful for the driver.

In other words, for example, when the first alarm information that is the alarm information of which the output request is received requests the driver to perform an operation that contradicts the third request operation that is included in the third alarm information, which is the other alarm information being outputted, and that is the operation for making a request to the driver; and safety is not reduced due to the first alarm information not being outputted, it is appropriately determined that the first alarm information is not useful for the driver.

Specifically, for example, when leftward steering (corresponding to the third request operation) is performed by the drive assist apparatus for avoiding a collision with an object in front, provision of a steering torque in the rightward direction for prompting rightward steering by the drive assist apparatus for preventing an approach to a rear-lateral vehicle during lane change, in order to prevent an approach to a rear vehicle traveling in the left side lane, is not an alarm useful for the driver. Therefore, in such a case, on the basis of the third request operation (=information prompting leftward steering) that is the other alarm information being outputted, it is appropriately determined that the first alarm information (=information prompting rightward steering) is not useful for the driver.

According to the eighth aspect, when the first request operation that is included in the first alarm information and that is the operation for making a request to the driver contradicts the third request operation, it is determined that the outputting is not useful. Therefore, it can further appropriately be determined whether or not the first alarm information is useful for the driver.

In other words, when the first request operation requests the driver to perform an operation that contradicts the third request operation being already outputted, it is appropriately determined that the first alarm information is not useful for the driver.

Specifically, for example, when leftward steering (corresponding to the third request operation) is performed by the drive assist apparatus for avoiding a collision with an object in front, provision of a steering torque in the rightward direction for prompting rightward steering (corresponding to the first request operation) by the drive assist apparatus for preventing an approach to a rear-lateral vehicle during lane change, in order to prevent an approach to a rear vehicle traveling in the left side lane, is not an alarm useful for the driver. Therefore, in such a case, on the basis of the third request operation (=information prompting leftward steering) that is the other alarm information being outputted, it is appropriately determined that the first alarm information (=information prompting rightward steering) is not useful for the driver.

According to the ninth aspect, when the type of the influence of the first request operation on the traveling state of the vehicle is the same as the type of the influence of the third request operation on the traveling state of the vehicle; and the direction of the influence of the first request operation on the traveling state of the vehicle is opposite to the direction of the influence of the third request operation on the traveling state of the vehicle, it is determined that the outputting is not useful. Therefore, it can further appropriately be determined whether or not the first alarm information is useful for the driver.

In other words, when the type of the influence of the first request operation on the traveling state of the vehicle is the same as the type of the influence of the third request operation on the traveling state of the vehicle; and the direction of the influence of the first request operation on the traveling state of the vehicle is opposite to the direction of the influence of the third request operation on the traveling state of the vehicle, the first request operation contradicts the third request operation, Thus, it can appropriately be determined that the first alarm information is not useful for the driver.

Specifically, for example, rightward steering and leftward steering are operations that contradict each other. In this case, the type of the influence on the traveling state of the vehicle is change of the traveling direction of the vehicle. In addition, for example, depression of the accelerator pedal (=acceleration operation) and depression of the brake pedal (=depression operation) are operations that contradict each other. In this case, the type of the influence on the traveling state of the vehicle is change of the speed of the vehicle.

According to the tenth aspect, the third request operation includes at least either one of the steering operation or the acceleration/deceleration operation. Thus, when the first alarm information is an important alarm, it can appropriately be determined whether or not the first alarm information is useful for the driver.

In other words, when the first alarm information is an important alarm, the first alarm information often includes information prompting the driver to perform a steering operation or an acceleration/deceleration operation. Thus, when the first alarm information is an important alarm, it can appropriately be determined whether or not the first alarm information is useful for the driver.

According to the eleventh aspect, the content of the first alarm information is modified to the content that the first request operation that is included in the first alarm information and that is the operation for making a request to the driver is not to be outputted, to generate the second alarm information. Therefore, the first alarm information is appropriately modified to generate appropriate alarm information as the second alarm information.

In other words, when the first request operation that is included in the first alarm information and that is the operation for making a request to the driver contradicts a driving operation of the driver, a request operation included in an alarm being already outputted, or the like, it is determined that the first alarm information is not useful. Thus, the first alarm information is modified to a content that the first request operation is not to be outputted, to appropriately modify the first alarm information to generate appropriate alarm information as the second alarm information.

According to the twelfth aspect, the first request operation that is included in the first alarm information and that is the operation for making a request to the driver is modified to the information that a driving state is notified to the driver, to generate the second alarm information. Therefore, the first alarm information is appropriately modified to generate appropriate alarm information as the second alarm information.

In other words, when the first request operation that is included in the first alarm information and that is the operation for making a request to the driver contradicts a driving operation of the driver, a request operation included in an alarm being already outputted, or the like, it is determined that the first alarm information is not useful. Thus, the first request operation is modified to the information that a driving state is notified to the driver, to further appropriately modify the first alarm information to generate further appropriate alarm information as the second alarm information.

That is to say, when the first request operation is modified to the information that a driving state is notified to the driver, the first request operation does not contradict the driving operation of the driver, the request operation included in the alarm being already outputted, or the like. In addition, since the first request operation is modified to the information that a driving state is notified to the driver, and is outputted, the information that is included in the first request operation and that is useful for the driver is outputted. Thus, further appropriate alarm information is generated as the second alarm information.

According to the thirteenth aspect, the first request operation includes at least either one of the steering operation or the acceleration/deceleration operation. Thus, when the first alarm information is an important alarm, the first alarm information is appropriately modified to generate appropriate alarm information as the second alarm information.

In other words, when the first alarm information is an important alarm, the first alarm information often includes information prompting the driver to perform a steering operation or an acceleration/deceleration operation. Thus, when the first alarm information is an important alarm, the first alarm information is appropriately modified to generate appropriate alarm information as the second alarm information.

According to the fourteenth aspect, the content of the first request operation that is included in the first alarm information and that is the operation for making a request to the driver is modified to the content that does not include the direction of the influence of the first request operation on the traveling state of the vehicle, to generate the second alarm information. Therefore, the first alarm information is appropriately modified to generate appropriate alarm information as the second alarm information.

In other words, when the first request operation that is included in the first alarm information and that is the operation for making a request to the driver contradicts a driving operation of the driver, a request operation included in an alarm being already outputted, or the like, it is determined that the first alarm information is not useful. Thus, the content of the first request operation is modified to the content that does not include the direction of the influence of the first request operation on the traveling state of the vehicle, to appropriately modify the first alarm information to generate appropriate alarm information as the second alarm information.

That is to say, when the content of the first request operation is modified to the content that does not include the direction of the influence of the first request operation on the traveling state of the vehicle, the first request operation does not contradict the driving operation of the driver, the request operation included in the alarm being already outputted, or the like. In addition, since the content of the first request operation is modified to the content that does not include the direction of the influence of the first request operation on the traveling state of the vehicle, and is outputted, the information that is included in the first request operation and that is useful for the driver is outputted. Thus, further appropriate alarm information is generated as the second alarm information.

According to the fifteenth aspect, the first request operation includes at least either one of the steering operation or the acceleration/deceleration operation. Thus, when the first alarm information is an important alarm, the first alarm information is appropriately modified to generate appropriate alarm information as the second alarm information.

In other words, when the first alarm information is an important alarm, the first alarm information often includes information prompting the driver to perform a steering operation or an acceleration/deceleration operation. Thus, when the first alarm information is an important alarm, the first alarm information is appropriately modified to generate appropriate alarm information as the second alarm information.

According to the sixteenth aspect, the first alarm information and the second alarm information are outputted via at least one of the audio information, the character information, and the image information. Therefore, alarm information can effectively be outputted as the first alarm information and the second alarm information.

According to the seventeenth aspect, the first alarm information and the second alarm information are outputted via the provision of the vibrations to at least either one of the driver or the operation unit operated by the driver. Therefore, alarm information can effectively be outputted as the first alarm information and the second alarm information.

According to the nineteenth aspect, the first alarm information and the second alarm information is outputted via the provision of the force to the operation unit operated by the driver. Therefore, alarm information can effectively be outputted as the first alarm information and the second alarm information.

According to the nineteenth aspect, the second alarm information is outputted via the provision of the force to the operation unit operated by the driver. Therefore, alarm information can effectively be outputted as the first alarm information and the second alarm information.

According to the twentieth aspect, the operation unit operated by the driver includes the steering wheel. Thus, the first alarm information and the second alarm information are outputted via provision of a force to the steering wheel. Therefore, alarm information can further effectively be outputted as the first alarm information and the second alarm information.

According to the twenty-first aspect, the drive assist apparatus includes at least one drive assist apparatus among the drive assist apparatus for preventing a deviation from a driving lane, the drive assist apparatus for ensuring an inter-vehicle distance from a preceding vehicle, the alarm output control apparatus for preventing an excess over a previously-set upper limit vehicle speed, the drive assist apparatus for preventing a collision with an object in front, the drive assist apparatus for preventing an approach to a rear-lateral vehicle during lane change, the drive assist apparatus for preventing decrease in vehicle speed that is caused by change of an inclination of a road surface, the drive assist apparatus for reducing a risk caused by an error of recognizing a stop sign, the drive assist apparatus for prompting deceleration corresponding to a curve curvature of a road in front, and the drive assist apparatus for reducing a risk caused by an error of recognizing a red light. Therefore, appropriate alarm information can be outputted.

In other words, since the alarm information is received from the drive assist apparatus that outputs an important alarm, appropriate alarm information can be outputted.

BRIEF DESCRIPTION OF THE DRAWINGS

FIG. 8 is a flowchart illustrating one example of an operation of the output adjustment ECU according to the second embodiment.

Figure 1:
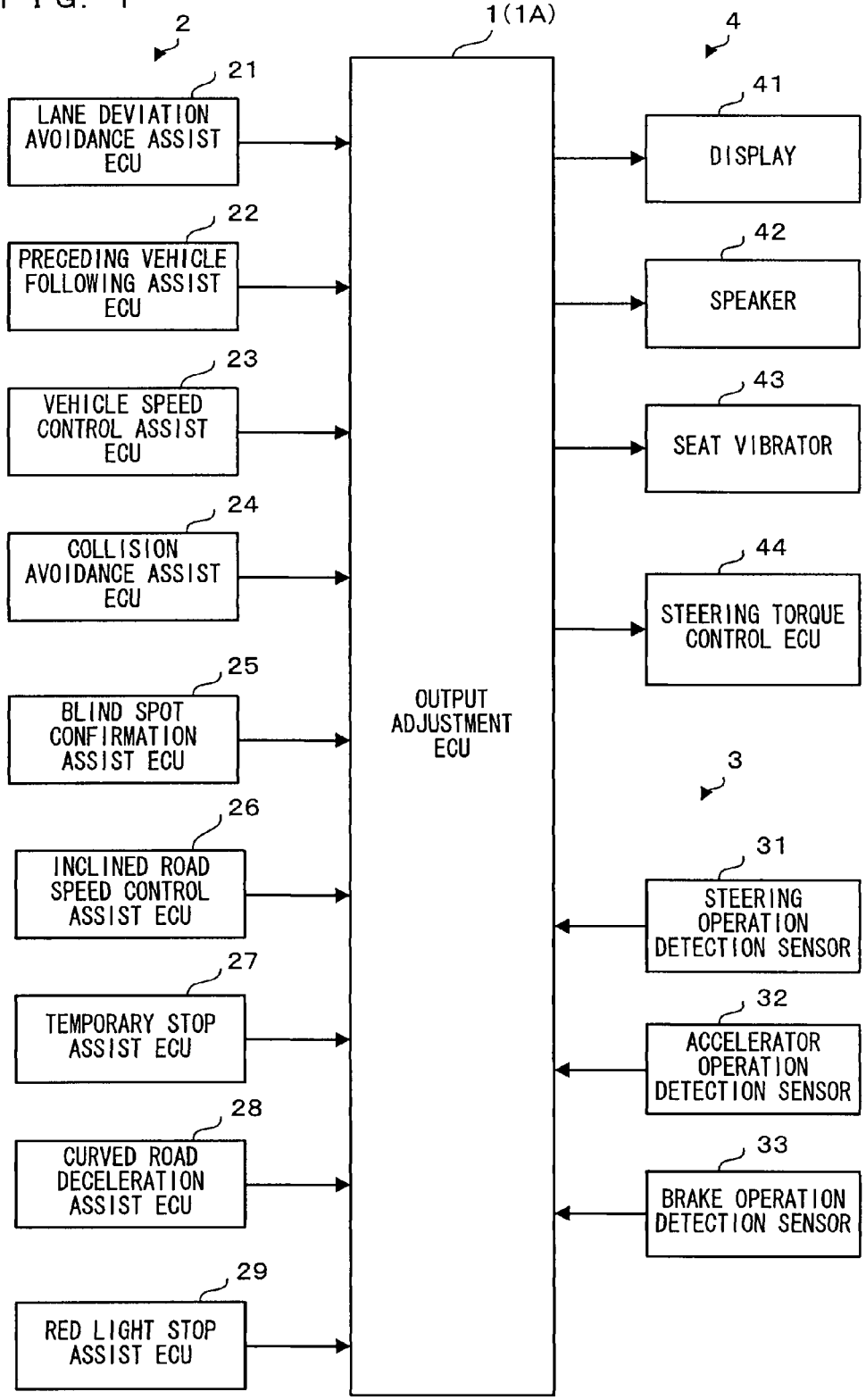
FIG. 1 is a block diagram illustrating one example of the configuration of an alarm output control apparatus according to the present invention.

DESCRIPTION OF THE REFERENCE CHARACTERS 1, 1A output adjustment ECU (alarm output control apparatus)
11 request reception section (request reception unit)
12, 12A usefulness determination section (part of usefulness determination unit)
13, 13A content modification section (content modification unit)
14 output execution section (part of output execution unit)
2 input apparatus (drive assist apparatus)
21 lane deviation avoidance assist ECU
22 preceding vehicle following assist ECU
23 vehicle speed control assist ECU
24 collision avoidance assist ECU
25 blind spot confirmation assist ECU
26 inclined road speed control assist ECU
27 temporary stop assist ECU
28 curved road deceleration assist ECU
29 red light stop assist ECU
3 input sensor (part of usefulness determination unit)
31 steering operation detection sensor
32 accelerator operation detection sensor
33 brake operation detection sensor
4 output apparatus (part of output execution unit)
41 display
42 speaker
43 seat vibrator
44 steering torque control ECU

BEST MODE FOR CARRYING OUT THE INVENTION

Hereinafter, embodiments of an alarm output control apparatus according to the present invention will be described with reference to the drawings. The alarm output control apparatus according to the present invention is an apparatus that is mounted in a vehicle and that controls output of alarm information from at least one drive assist apparatus to a driver. First, one example of the configuration of the alarm output control apparatus mounted in the vehicle will be described with reference to FIG. 1.

FIG. 1 is a block diagram illustrating one example of the configuration of the alarm output control apparatus according to the present invention. As shown in FIG. 1, an output adjustment ECU (Electronic Control Unit) 1 according to the present invention (corresponding to the alarm output control apparatus) is connected to an input apparatus 2, an input sensor 3, and an output apparatus 4 that are peripheral apparatuses, in a manner capable of communicating with the input apparatus 2, the input sensor 3, and the output apparatus 4.

First, the input apparatus 2 for the output adjustment ECU 1 will be described with reference to FIG. 1. The input apparatus 2 (corresponding to the drive assist apparatus) is a drive assist ECU that assists a driving operation of the driver, and includes a lane deviation avoidance assist ECU 21, a preceding vehicle following assist ECU 22, a vehicle speed control assist ECU 23, a collision avoidance assist ECU 24, a blind spot confirmation assist ECU 25, an inclined road speed control assist ECU 26, a temporary stop assist ECU 27, a curved road deceleration assist ECU 28, and a red light stop assist ECU 29.

The lane deviation avoidance assist ECU 21 is an ECU that outputs, as alarm information, "information for preventing a deviation from a driving lane". Specifically, the lane deviation avoidance assist ECU 21 determines a possibility that the own vehicle will deviate from a lane, by using position information of white lines that are drawn on both edges of the lane and that are detected by a white line detection camera or the like. In addition, when the possibility that the own vehicle will deviate from the lane becomes high, the lane deviation avoidance assist ECU 21 outputs, to the output adjustment ECU 1 (here, a request reception section 11: see FIGS. 2 and 7), an alarm including a request operation (here, a steering operation) for prompting the driver to perform an operation for avoiding the deviation from the lane, and the like. Here, the "request operation" is an operation that is included in the alarm information and that prompts the driver to perform an operation.

Specifically, for example, when the possibility that the own vehicle will deviate from the lane becomes high, the lane deviation avoidance assist ECU 21 outputs, to the output adjustment ECU 1, instruction information that instructs provision of a steering torque in a direction for avoiding the deviation from the lane via a steering torque control ECU 44, instruction information that instructs display of an image (see FIG. 6) representing the direction of the deviation via a display 41, instruction information that instructs provision of vibrations in the direction of the deviation to the driver via a seat vibrator 43, and instruction information that instructs output of a buzzer sound drawing the driver's attention via a speaker 42.

Here, the provision of the steering torque in the direction for avoiding the deviation from the lane, the display of the image representing the direction of the deviation, and the provision of the vibrations in the direction of the deviation to the driver are an alarm including a request operation (here, a steering operation) for prompting the driver to perform an operation for avoiding the deviation from the lane.

The preceding vehicle following assist ECU 22 is an ECU that outputs, as alarm information, "information for ensuring an inter-vehicle distance from a preceding vehicle". Specifically, the preceding vehicle following assist ECU 22 performs acceleration/deceleration control such that the inter-vehicle distance from the preceding vehicle agrees with a previously-set target distance, by using information such as a distance from and a relative speed of the preceding vehicle which are detected by a millimeter wave radar device or the like. In addition, when the inter-vehicle distance from the preceding vehicle is equal to or less than a previously-set shortest distance, the preceding vehicle following assist ECU 22 outputs, to the output adjustment ECU 1 (here, the request reception section 11: see FIGS. 2 and 7), an alarm including a request operation (here, an acceleration/deceleration operation) for prompting the driver to perform an operation for maintaining the inter-vehicle distance, and the like.

The vehicle speed control assist ECU 23 is an ECU that outputs, as alarm information, "information for preventing an excess over a previously-set upper limit vehicle speed". Specifically, the vehicle speed control assist ECU 23 performs acceleration/deceleration control through engine control such that a vehicle speed is maintained at a previously-set target speed. In addition, when an excess over the upper limit of the target speed cannot be avoided through the engine control at a downward slope or the like, the vehicle speed control assist ECU 23 outputs, to the output adjustment ECU 1 (here, the request reception section 11: see FIGS. 2 and 7), an alarm including a request operation (here, an acceleration/deceleration operation) for prompting the driver to perform an operation for avoiding an excess over the upper limit of the target speed, and the like.

Specifically, for example, when an excess over the upper limit of the target speed cannot be avoided through the engine control, the vehicle speed control assist ECU 23 outputs, to the output adjustment ECU 1, instruction information that instructs display of an image (see FIG. 15) representing the excess over the upper limit of the target speed via the display 41, and instruction information that instructs output of a buzzer sound drawing the driver's attention via the speaker 42.

Here, the display of the image representing the excess over the upper limit of the target speed is an alarm including a request operation (here, a deceleration operation) for prompting the driver to perform an operation for avoiding the excess over the upper limit of the target speed.

The collision avoidance assist ECU 24 is an ECU that outputs, as alarm information, "information for preventing a collision with an object in front". Specifically, the collision avoidance assist ECU 24 determines a possibility that the own vehicle will collide with an object in front such as a vehicle, by using a distance from and a relative speed of the object which are detected by a millimeter wave radar device or the like. In addition, when the possibility of the collision with the object becomes high, the lane deviation avoidance assist ECU 21 outputs, to the output adjustment ECU 1 (here, the request reception section 11: see FIGS. 2 and 7), an alarm including a request operation (here, an acceleration/deceleration operation and a steering operation) for prompting the driver to perform an operation for avoiding the collision.

Specifically, for example, when the possibility that the own vehicle will collide with the object becomes high, the collision avoidance assist ECU 24 outputs, to the output adjustment ECU 1, instruction information that instructs provision of a steering torque in a direction for avoiding the collision via the steering torque control ECU 44, instruction information that instructs display of an image representing the direction for avoiding the collision via the display 41, and instruction information that instructs output of a buzzer sound drawing the driver's attention via the speaker 42.

Here, the provision of the steering torque in the direction for avoiding the collision and the display of the image representing the direction for avoiding the collision are an alarm including a request operation (here, a steering operation) for prompting the driver to perform an operation for avoiding the collision.

The blind spot confirmation assist ECU 25 is an ECU that outputs, as alarm information, "information for preventing an approach to a rear-lateral vehicle during lane change". Specifically, the blind spot confirmation assist ECU 25 determines a possibility of a collision with a laterally-traveling vehicle during lane change, by using information such as a distance from a rear-lateral (lateral) vehicle which is detected by a millimeter wave radar device, a camera, or the like. In addition, when the possibility of the collision with the laterally-traveling vehicle becomes high, the blind spot confirmation assist ECU 25 outputs, to the output adjustment ECU 1 (here, the request reception section 11: see FIGS. 2 and 7), an alarm including a request operation (here, a steering operation) for prompting the driver to perform an operation for avoiding the collision, and the like.

Specifically, for example, when the possibility of the collision with the laterally-traveling vehicle becomes high, the blind spot confirmation assist ECU 25 outputs, to the output adjustment ECU 1, instruction information that instructs provision of a steering torque (see FIG. 11) in a direction for avoiding the collision via the steering torque control ECU 44, instruction information that instructs display of an image (see FIG. 12) representing the direction for avoiding the collision via the display 41, instruction information that instructs provision of vibrations (see FIG. 11) to a steering wheel via the steering torque control ECU 44, instruction information that instructs output of a buzzer sound drawing the driver's attention via the speaker 42.

Here, the provision of the vibrations in the direction for avoiding the collision and the display of the image representing the direction for avoiding the collision are an alarm including a request operation (here, a steering operation) for prompting the driver to perform an operation for avoiding the collision.

The inclined road speed control assist ECU 26 is an ECU that outputs, as alarm information, "information for preventing a deceleration that is caused by an inclination of a road surface and the like and that is against an intention". Specifically, the inclined road speed control assist ECU 26 detects presence/absence of a deceleration operation of the driver via a throttle opening sensor or the like, and also determines whether or not a deceleration against the driver's intention has occurred, by using a vehicle speed detected by a vehicle speed sensor or the like. Then, when a deceleration against the driver's intention has occurred, the inclined road speed control assist ECU 26 outputs, to the output adjustment ECU 1 (here, the request reception section 11: see FIGS. 2 and 7), an alarm including a request operation (here, an acceleration operation) for prompting the driver to perform an operation for avoiding the deceleration against the driver's intention, and the like.

Specifically, for example, when a deceleration against the driver's intention has occurred, the inclined road speed control assist ECU 26 outputs, to the output adjustment ECU 1, instruction information that instructs display of an image (see FIG. 15) drawing an attention to a decrease in speed via the display 41 and instruction information that instructs output of a voice prompting speed maintenance (e.g., "please drive while maintaining speed") via the speaker 42.

Here, the output of the voice prompting speed maintenance is an alarm including a request operation (here, a speed maintenance operation) for prompting the driver to perform an operation for avoiding the deceleration against the intention.

The temporary stop assist ECU 27 is an ECU that outputs, as alarm information, "information for preventing an error of recognizing a stop sign at an intersection or the like". Specifically, the temporary stop assist ECU 27 previously stores, as map information, position information of locations where there are stop signs, and determines that an error of recognizing a stop sign has occurred, by using navigation information and a vehicle speed detected by a vehicle speed sensor or the like, when approaching to a location where there is a stop sign without deceleration. In addition, when determining that an error of recognizing a stop sign has occurred, the temporary stop assist ECU 27 outputs, to the output adjustment ECU 1 (here, the request reception section 11: see FIGS. 2 and 7), an alarm including a request operation (here, a deceleration operation and a stop operation) for prompting a temporary stop.

Specifically, for example, when determining that an error of recognizing a stop sign has occurred, the temporary stop assist ECU 27 outputs, to the output adjustment ECU 1, instruction information that instructs display of an image representing a stop sign via the display 41, instruction information that instructs provision of vibrations to the driver via the seat vibrator 43, and instruction information that instructs output of a buzzer sound drawing the driver's attention via the speaker 42.

Here, the display of the image representing the stop sign is an alarm including a request operation (here, a deceleration operation and a stop operation) for prompting the driver to make a temporally stop.

The curved road deceleration assist ECU 28 is an ECU that outputs, as alarm information, "information for decelerating to a traveling speed appropriate for the curvature of a curved road". Specifically, the curved road deceleration assist ECU 28 obtains the curvature of a curved road in front from navigation information, and determines whether or not a vehicle speed detected by a vehicle speed sensor or the like is appropriate. Then, when the vehicle speed is not appropriate, the curved road deceleration assist ECU 28 outputs, to the output adjustment ECU 1 (here, the request reception section 11: see FIGS. 2 and 7), an alarm including a request operation (here, a deceleration operation) for prompting an entry into the curved road at a speed appropriate for the curved road.

Specifically, for example, when the vehicle speed is not appropriate, the curved road deceleration assist ECU 28 outputs, to the output adjustment ECU 1, instruction information that instructs display of an image prompting an entry into the curved road at a speed appropriate for the curved road (e.g., an image representing characters of "There is curved road of R50 m in front. Please slow down to 30 km/h!") via the display 41, instruction information that instructs provision of vibrations to the driver via the seat vibrator 43, and instruction information that instructs output of a buzzer sound drawing the driver's attention via the speaker 42.

Here, the display of the image prompting the entry into the curved road at the speed appropriate for the curved road is an alarm including a request operation (here, a deceleration operation) for prompting the driver to decelerate.

The red light stop assist ECU 29 is an ECU that outputs, as alarm information, "information for preventing an error of recognizing a red light at an intersection or the like". Specifically, the red light stop assist ECU 29 obtains a state (color change timing and the like) of a traffic light in front by means of road-to-vehicle communication, and determines that an error of recognizing a red light has occurred, by using a vehicle speed detected by a vehicle speed sensor or the like, when approaching to a location where there is a traffic light that has turned red without deceleration. In addition, when an error of recognizing a red light has occurred, the red light stop assist ECU 29 outputs, to the output adjustment ECU 1 (here, the request reception section 11: see FIGS. 2 and 7), an alarm including a request operation (here, a deceleration operation and a stop operation) for prompting a stop.

Specifically, for example, when determining that an error of recognizing a red light has occurred, the red light stop assist ECU 29 outputs, to the output adjustment ECU 1, instruction information that instructs display of an image representing a red light via the display 41, instruction information that instructs provision of vibrations to the driver via the seat vibrator 43, and instruction information that instructs output of a buzzer sound drawing the driver's attention via the speaker 42.

Here, the display of the image representing the red light is an alarm including a request operation (here, a deceleration operation and a stop operation) for prompting the driver to stop the vehicle.

In this manner, alarm information is outputted from the lane deviation avoidance assist ECU 21, the preceding vehicle following assist ECU 22, the vehicle speed control assist ECU 23, the collision avoidance assist ECU 24, the blind spot confirmation assist ECU 25, the inclined road speed control assist ECU 26, the temporary stop assist ECU 27, the curved road deceleration assist ECU 28, and the red light stop assist ECU 29 to the output adjustment ECU 1 (the request reception section 11). Thus, the output adjustment ECU 1 (the request reception section 11) receives appropriate alarm information.

In the present embodiment, the case is described where the input apparatus 2 includes the lane deviation avoidance assist ECU 21, the preceding vehicle following assist ECU 22, the vehicle speed control assist ECU 23, the collision avoidance assist ECU 24, the blind spot confirmation assist ECU 25, the inclined road speed control assist ECU 26, the temporary stop assist ECU 27, the curved road deceleration assist ECU 28, and the red light stop assist ECU 29. However, it suffices that the input apparatus 2 includes at least one ECU among the lane deviation avoidance assist ECU 21, the preceding vehicle following assist ECU 22, the vehicle speed control assist ECU 23, the collision avoidance assist ECU 24, the blind spot confirmation assist ECU 25, the inclined road speed control assist ECU 26, the temporary stop assist ECU 27, the curved road deceleration assist ECU 28, and the red light stop assist ECU 29. It should be noted that when the input apparatus 2 includes more ECUs that output drive assist information, the effect of the output adjustment ECU 1 increases.

Further, in the present embodiment, the case is described where alarm information is inputted from the ECUs such as the lane deviation avoidance assist ECU 21 to the output adjustment ECU 1. However, alarm information may be inputted from another apparatus, a system, or the like to the output adjustment ECU 1. For example, alarm information may be inputted from a navigation system to the output adjustment ECU 1.

Next, the input sensor 3 for the output adjustment ECU 1 will be described with reference to FIG. 1. The input sensor 3 (corresponding to part of a usefulness determination unit) is a sensor (=an operation detection sensor) for detecting an operation of the driver, and includes a steering operation detection sensor 31, an accelerator operation detection sensor 32, and a brake operation detection sensor 33.

Figure 2:
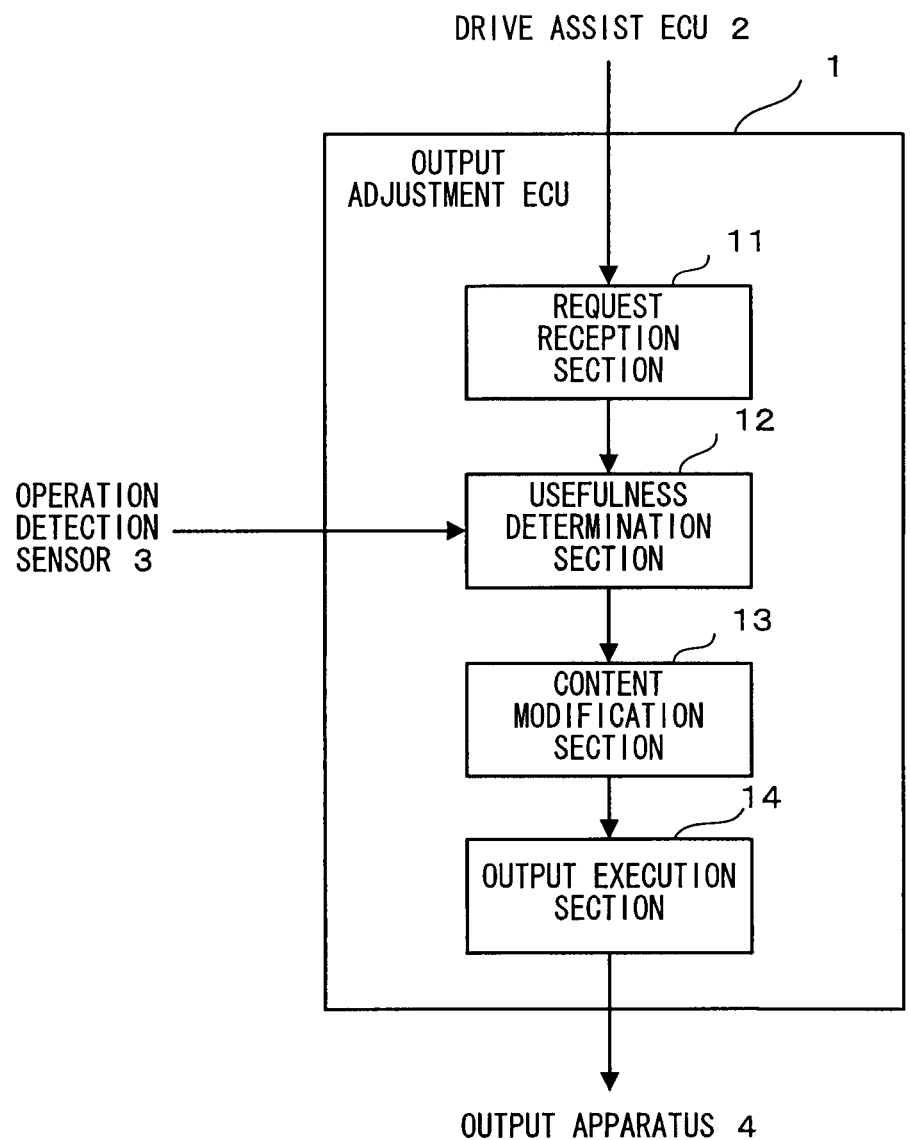
FIG. 2 is a block diagram illustrating one example of the functional configuration of an output adjustment ECU according to a first embodiment.

The steering operation detection sensor 31 is composed of a steering sensor and the like, is a sensor for detecting a steering angle, and outputs detected steering angle information to the output adjustment ECU 1 (a usefulness determination section 12 shown in FIG. 2).

The accelerator operation detection sensor 32 is composed of a throttle opening sensor and the like, is a sensor for detecting a depression amount of an accelerator pedal, and outputs detected depression amount information to the output adjustment ECU 1 (the usefulness determination section 12 shown in FIG. 2).

The brake operation detection sensor 33 is a sensor for detecting a depression amount of a brake pedal, and outputs detected depression amount information to the output adjustment ECU 1 (the usefulness determination section 12 shown in FIG. 2).

Next, the output apparatus 4 for the output adjustment ECU 1 will be described with reference to FIG. 1. The output apparatus 4 (corresponding to part of an output execution unit) includes the display 41, the speaker 42, the seat vibrator 43, and the steering torque control ECU 44.

The display 41 is composed of an LCD (Liquid Crystal Display) provided in front of a driver's seat and the like, and displays an image, characters, and the like according to an instruction from the output adjustment ECU 1 (here, an output execution section 14: see FIGS. 2 and 7) such that they are visible from the driver.

Figure 7:
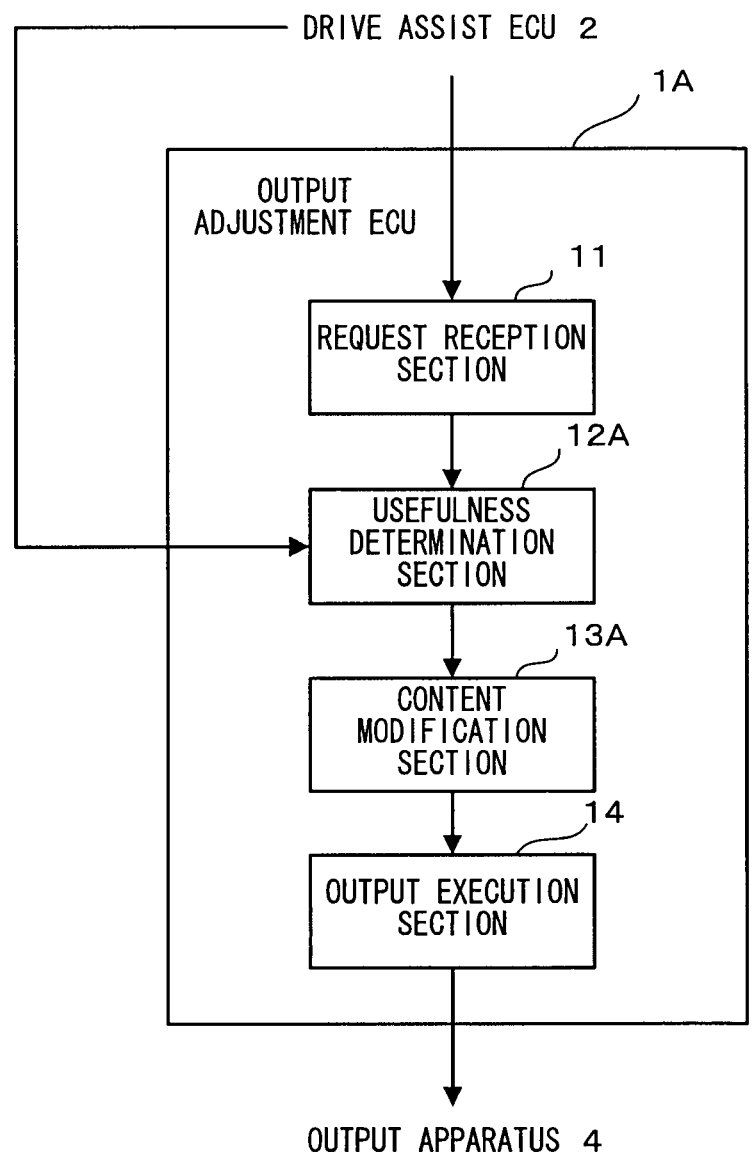
FIG. 7 is a block diagram illustrating one example of the functional configuration of an output adjustment ECU according to a second embodiment.

The speaker 42 is provided laterally to the driver's seat and outputs a voice such as a guidance to the driver according to an instruction from the output adjustment ECU 1 (here, the output execution section 14: see FIGS. 2 and 7).

The seat vibrator 43 is provided on both right and left sides of a seat lower portion of the driver's seat and provides vibrations on the right side, the left side, or both the right and left sides to the driver according to an instruction from the output adjustment ECU 1 (here, the output execution section 14: see FIGS. 2 and 7).

The steering torque control ECU 44 is an ECU for controlling a steering torque provided to the steering wheel, and provides a steering torque to the steering wheel according to an instruction from the output adjustment ECU 1 (here, the output execution section 14: see FIGS. 2 and 7).

First Embodiment

FIG. 2 is a block diagram illustrating one example of the functional configuration of an output adjustment ECU according to a first embodiment. As shown in FIG. 2, the output adjustment ECU 1 functionally includes a request reception section 11, a usefulness determination section 12, a content modification section 13, and an output execution section 14.

It should be noted that the output adjustment ECU 1 causes a microcomputer provided in an appropriate position in the output adjustment ECU 1 to execute a control program previously stored in a ROM (Read Only Memory) or the like provided in an appropriate position in the output adjustment ECU 1, to cause the microcomputer to functionally operate as functional sections such as the request reception section 11, the usefulness determination section 12, the content modification section 13, and the output execution section 14.

The request reception section 11 (corresponding to a request reception unit) is a functional section that receives an output request of alarm information for the driver from the input apparatus (=drive assist ECU) 2. Specifically, the request reception section 11 receives an alarm for preventing a deviation from a driving lane, an alarm for maintaining an inter-vehicle distance from a preceding vehicle, an alarm for preventing an excess over the previously-set upper limit vehicle speed, an alarm for preventing a collision with an object in front, an alarm for preventing an approach to a rear-lateral vehicle during lane change, an alarm for preventing a decrease in vehicle speed that is caused by a change of the inclination of a road surface, an alarm for reducing a risk caused by an error of recognizing a stop sign, an alarm for prompting deceleration corresponding to the curve curvature of a road in front, and an alarm for reducing a risk caused by an error of recognizing a red light, from the lane deviation avoidance assist ECU 21, the preceding vehicle following assist ECU 22, the vehicle speed control assist ECU 23, the collision avoidance assist ECU 24, the blind spot confirmation assist ECU 25, the inclined road speed control assist ECU 26, the temporary stop assist ECU 27, the curved road deceleration assist ECU 28, and the red light stop assist ECU 29, respectively, which are shown in FIG. 1.

The usefulness determination section 12 (corresponding to part of the usefulness determination unit) is a functional section that, when an output request is received by the request reception section 11, determines whether or not outputting first alarm information that is alarm information of which the output request is received is useful for the driver. Specifically, the usefulness determination section 12 detects a driving operation of the driver via the input sensor (=operation detection sensor) 3 shown in FIG. 1, and determines whether or not the outputting is useful, on the basis of the content of the detected driving operation.

More specifically, the usefulness determination section 12 determines that the outputting is not useful, when a first request operation that is included in the first alarm information, which is the alarm information of which the output request is received by the request reception section 11, and that is an operation for making a request to the driver contradicts the driving operation of the driver. Here, for example, the usefulness determination section 12 determines that the outputting is not useful, when the type of the influence of the first request operation on the traveling state of the vehicle is the same as the type of the influence of the driving operation on the traveling state of the vehicle; and the direction of the influence of the first request operation on the traveling state of the vehicle is opposite to the direction of the influence of the driving operation on the traveling state of the vehicle.

Figure 4:
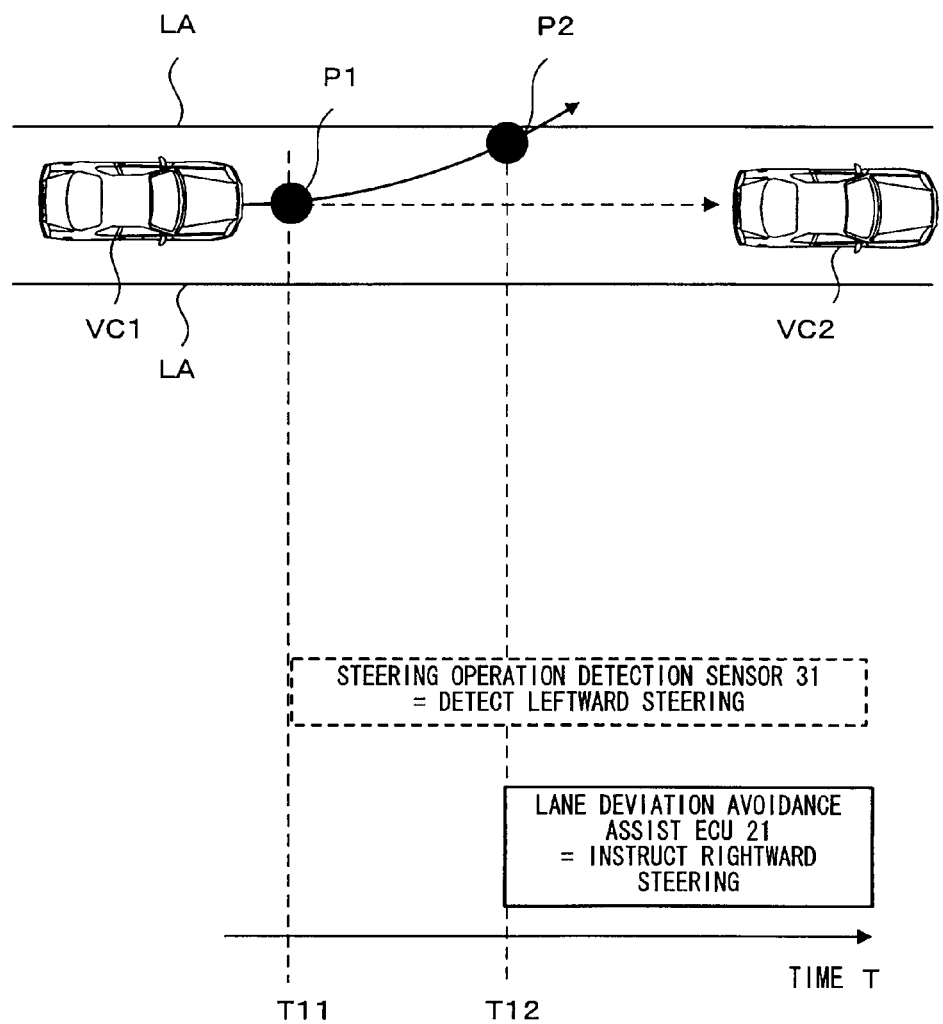
FIG. 4 is an illustration diagram illustrating one example of a situation where output adjustment of alarm information is performed by the output adjustment ECU according to the first embodiment.

FIG. 4 is an illustration diagram illustrating one example of a situation where output adjustment of alarm information is performed by the output adjustment ECU according to the first embodiment. The upper diagram of FIG. 4 is a plan view for illustrating the situation, and the lower diagram of FIG. 4 is a timing chart. As shown in the upper diagram of FIG. 4, a vehicle VC1 in which the output adjustment ECU 1 according to the present invention is mounted is traveling toward the right side of the drawing in a lane in which white lines LA are drawn on both sides. In front of the vehicle VC1, a preceding vehicle VC2 is traveling toward the right side of the drawing in the same lane as the lane in which the vehicle VC1 is traveling.

Then, in order to avoid a collision with the preceding vehicle VC2, from time T11 at which the vehicle VC1 reaches a point P1, leftward steering is performed by the driver, and detection information that instructs leftward steering is detected by the usefulness determination section 12 via the steering operation detection sensor 31 shown in FIG. 1. In this situation, from time T12 at which the vehicle VC1 reaches a point P2, alarm information including a request operation for prompting rightward steering is received by the request reception section 11 from the lane deviation avoidance assist ECU 21, in order to avoid a deviation from the lane.

In other words, in a state where leftward steering is performed by the driver, the alarm information (=first alarm information) including the request operation (=rightward steering: first request operation) that contradicts the operation of the driver is received. Thus, the usefulness determination section 12 determines that the outputting is not useful.

To be more precise, the type of the influence of the first request operation (=rightward steering) on the traveling state of the vehicle VC1 is change of the traveling direction of the vehicle VC1 and is the same as the type of the influence of the driving operation (=leftward steering) on the traveling state of the vehicle VC1. In addition, the direction of the influence of the first request operation (=rightward steering) on the traveling state of the vehicle VC1 is the rightward direction and is opposite to the direction (=leftward direction) of the influence of the driving operation (=leftward steering) on the traveling state of the vehicle VC1. Therefore, the usefulness determination section 12 determines that the first alarm information including the first request operation is not useful.

In this manner, the usefulness determination section 12 determines whether or not the outputting is useful, on the basis of the content of the driving operation of the driver.

Therefore, it can appropriately be determined whether or not the first alarm information is useful for the driver.

In other words, for example, when the first alarm information that is the alarm information of which the output request is received disturbs a driving operation performed intentionally by the driver; and safety is not reduced due to the first alarm information not being outputted, it is appropriately determined that the first alarm information is not useful for the driver.

In the first embodiment, the case is described where the usefulness determination section 12 determines whether or not the outputting is useful, on the basis of the content of the driving operation of the driver. However, the usefulness determination section 12 may determine whether or not the outputting is useful, on the basis of other information instead of (or in addition to) the content of the driving operation of the driver. For example, the usefulness determination section 12 may determine whether or not the outputting is useful, on the basis of the content of the driving operation of the driver and third alarm information that is other alarm information being outputted. In this case, it can further appropriately be determined whether or not the outputting is useful.

Further, the usefulness determination section 12 determines that the outputting is not useful, when the first request operation (here, rightward steering) that is included in the first alarm information, which is the alarm information received by the request reception section 11, and that is an operation for making a request to the driver contradicts the driving operation (here, leftward steering) of the driver. Therefore, it can further appropriately be determined whether or not the first alarm information is useful for the driver.

In other words, for example, when the first request operation (here, rightward steering) that is included in the alarm information, of which the output request is received, and that is the operation for making a request to the driver contradicts the driving operation (here, leftward steering) performed intentionally by the driver; and safety is not reduced due to the content of the first request operation not being outputted, it is appropriately determined that the first alarm information including the first request operation is not useful for the driver.

In the first embodiment, the case is described where the usefulness determination section 12 determines that the outputting is not useful, when the first request operation contradicts the driving operation of the driver. However, it suffices that the usefulness determination section 12 determines whether or not the outputting is useful, on the basis of the driving operation of the driver. For example, the usefulness determination section 12 may determine that the outputting is not useful, also when the first request operation is the same operation as the driving operation of the driver instead of (or in addition to) when the first request operation contradicts the driving operation of the driver. In other words, when the first request operation is the same operation as the driving operation of the driver, the driver has already performed the same operation as the first request operation, and thus it is determined that the outputting is not useful.

Moreover, as describe with reference to FIG. 4, when the type of the influence of the first request operation (here, rightward steering) on the traveling state of the vehicle VC1 is the same (here, change of the traveling direction of the vehicle VC1) as the type of the influence of the driving operation (here, leftward steering) on the traveling state of the vehicle VC1; and the direction (here, the rightward direction) of the influence of the first request operation on the traveling state of the vehicle VC1 is opposite to the direction (here, the leftward direction) of the influence of the driving operation on the traveling state of the vehicle VC1, the usefulness determination section 12 appropriately determines that the first request operation contradicts the driving operation of the driver. Therefore, the usefulness determination section 12 can appropriately determine that the first alarm information is not useful for the driver.

Again referring back to FIG. 2, the functional configuration of the output adjustment ECU 1 will be described. The content modification section 13 (corresponding to a content modification unit) is a functional section that, when the usefulness determination section 12 determines that the outputting is not useful, modifies the content of the first alarm information to generate second alarm information that is alarm information useful for the driver.

Specifically, the content modification section 13 modifies the content to a content that the first request operation, which is included in the first alarm information and which is the operation for making a request to the driver, is not to be outputted, to generate the second alarm information. For example, as described with reference to FIG. 1, instruction information that instructs, as a request operation, provision of a steering torque in a direction for avoiding a deviation from a lane is inputted from the lane deviation avoidance assist ECU 21. Thus, at time T12 in FIG. 4, instruction information that instructs provision of a steering torque in the rightward direction is outputted from the lane deviation avoidance assist ECU 21.

Further, as described with reference to FIG. 4, at time T12, the driver performs leftward steering intentionally (=in order to avoid a collision with the preceding vehicle VC2), and thus providing the steering torque in the rightward direction on the basis of the instruction from the lane deviation avoidance assist ECU 21 is not useful for the driver. Therefore, by the content modification section 13, the first request operation that is the provision of the steering torque in the rightward direction is modified not to be outputted.

In this manner, the content modification section 13 modifies the first alarm information to the content that the first request operation (here, the provision of the steering torque in the rightward direction) included in the first alarm information is not to be outputted. Thus, the first alarm information is appropriately modified to generate appropriate alarm information as the second alarm information.

In the first embodiment, the case is described where the content modification section 13 modifies the content to the content that the first request operation, which is included in the first alarm information and which is the operation for making a request to the driver, is not to be outputted, to generate the second alarm information. However, the content modification section 13 may modify the first alarm information by another method to generate the second alarm information. For example, the content modification section 13 may modify the first request operation to information that a driving state is notified to the driver. In the situation shown in FIG. 4, for example, the content modification section 13 may modify "the provision of the steering torque in the rightward direction", which is the first request operation, to audio information that a driving state, "the vehicle is about to deviate from the lane", is notified.

Moreover, the content modification section 13 modifies the content of the first request operation that is included in the first alarm information and that is the operation for making a request to the driver, to a content that does not include the direction of the influence of the first request operation on the traveling state of the vehicle, to generate the second alarm information. For example, as described with reference to FIG. 1, instruction information that instructs display of an image (see FIG. 6) representing the direction of a deviation via the display 41 and instruction information that instructs provision of vibrations in the direction of the deviation to the driver via the seat vibrator 43 are outputted as request operations from the lane deviation avoidance assist ECU 21. Thus, at time T12 in FIG. 4, instruction information that instructs display of an image (see the lower drawing of FIG. 6) representing a deviation from the lane in the leftward direction via the display 41 and instruction information that instructs provision of vibrations in the leftward direction that is the direction of the deviation to the driver via the seat vibrator 43 are outputted from the lane deviation avoidance assist ECU 21.

Further, as described with reference to FIG. 4, at time T12, the driver performs leftward steering intentionally (=in order to avoid a collision with the preceding vehicle VC2). Thus, displaying the image (see the lower drawing of FIG. 6) representing the deviation from the lane in the leftward direction via the display 41 and providing the vibrations in the leftward direction, which is the direction of the deviation, to the driver via the seat vibrator 43 on the basis of the instruction from the lane deviation avoidance assist ECU 21, are not useful for the driver.

Therefore, the content modification section 13 modifies the display of the image (see the lower drawing of FIG. 6) representing the deviation from the lane in the leftward direction, to display of an image (see the upper drawing of FIG. 6) representing merely a deviation from the lane, to generate second alarm information including this content. In addition, the content modification section 13 modifies the provision of the vibrations in the leftward direction that is the direction of the deviation, to provision of both-side vibrations that represent merely the deviation from the lane, to generate second alarm information including this content.

In this manner, the content modification section 13 modifies the content of the first request operation included in the first alarm information, to the content that does not include the direction of the influence of the first request operation on the traveling state of the vehicle. Thus, the first alarm information is appropriately modified to generate appropriate alarm information as the second alarm information.

In the first embodiment, the case is described where the content modification section 13 modifies the content of the first request operation that is included in the first alarm information and that is the operation for making a request to the driver, to the content that does not include the direction of the influence of the first request operation on the traveling state of the vehicle. However, the content modification section 13 may modify the first alarm information by another method to generate the second alarm information. For example, the content modification section 13 may modify the first alarm information to information that the first request operation is not to be outputted. In the situation shown in FIG. 4, for example, the content modification section 13 may modify the first alarm information to information that "the display of the image (see the lower drawing of FIG. 6) representing the deviation from the lane in the leftward direction" and "the provision of the vibrations in the leftward direction that is the direction of the deviation", which are the first request operation, are not to be outputted.

The output execution section 14 (corresponding to part of the output execution unit) is a functional section that outputs the first alarm information or the second alarm information via the output apparatus 4. In other words, when the usefulness determination section 12 determines that the outputting is useful, the output execution section 14 outputs the first alarm information of which the output request is received by the request reception section 11. In addition, when the usefulness determination section 12 determines that the outputting is not useful, the output execution section 14 outputs the second alarm information generated by the content modification section 13.

Figure 3:
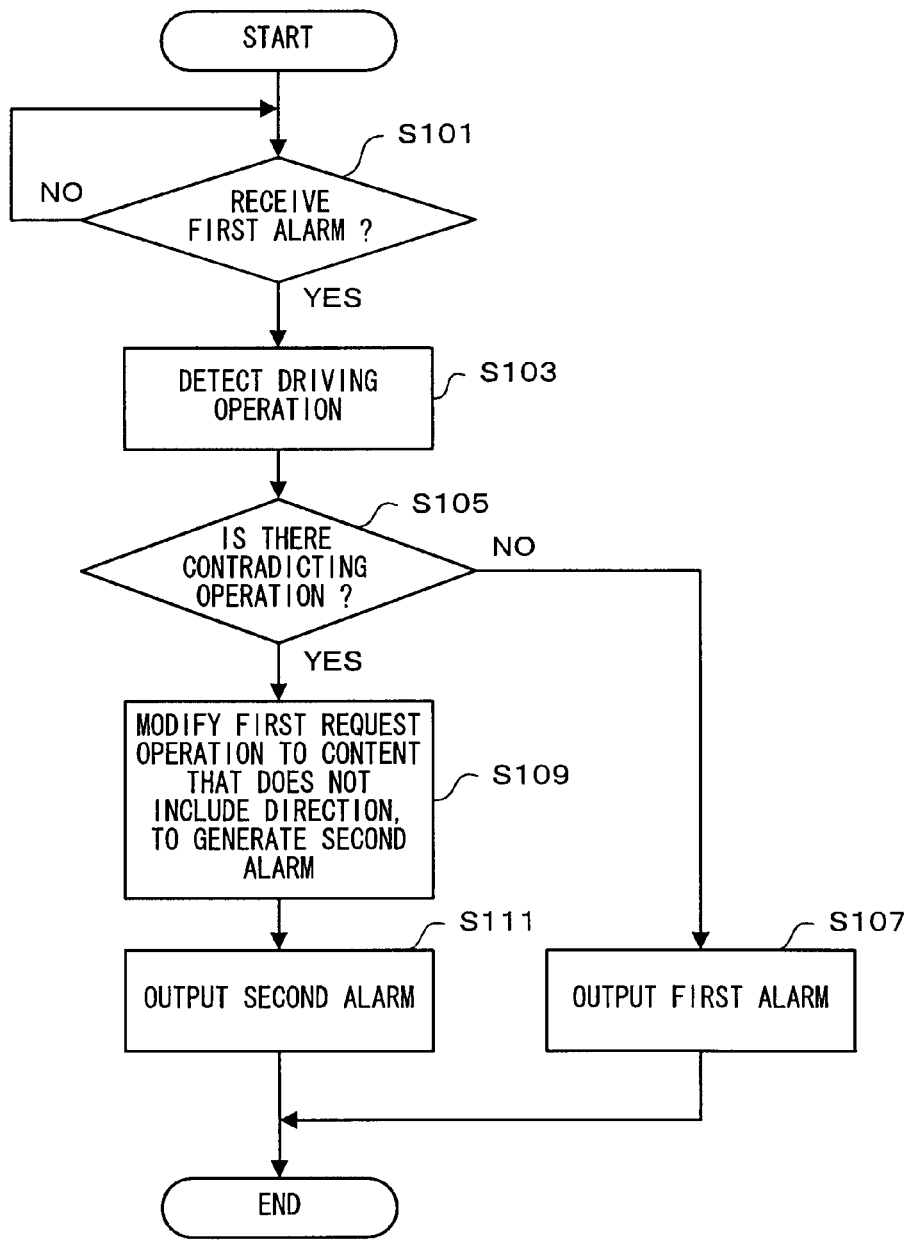
FIG. 3 is a flowchart illustrating one example of an operation of the output adjustment ECU according to the first embodiment.

FIG. 3 is a flowchart illustrating one example of an operation of the output adjustment ECU 1 according to the first embodiment. First, the request reception section 11 determines whether or not first alarm information has been received via the drive assist ECU 2 (S101). When it is determined that the first alarm information has not been received (NO at S101), the processing enters a standby state. When it is determined that the first alarm information has been received (YES at S101), the usefulness determination section 12A detects a driving operation of the driver via the input sensor (=operation detection sensor) 3 (S103).

Then, the usefulness determination section 12 determines whether or not a first request operation that is included in the first alarm information received at step S101 and that is an operation for making a request to the driver contradicts the driving operation detected at step S103 (S105). When it is determined that the first request operation does not contradict the driving operation (NO at S105), the output execution section 14 outputs the first alarm information received at step S101 (S107). When it is determined that the first request operation contradicts the driving operation (YES at S105), the content modification section 13 modifies the content of the first alarm information received at step S101 to a content that does not include the first request operation included in the first alarm information, and the like, to generate second alarm information that is alarm information useful for the driver (S109). Then, the output execution section 14 outputs the second alarm information generated at step S109 (S111), and the processing ends.

Figure 5:
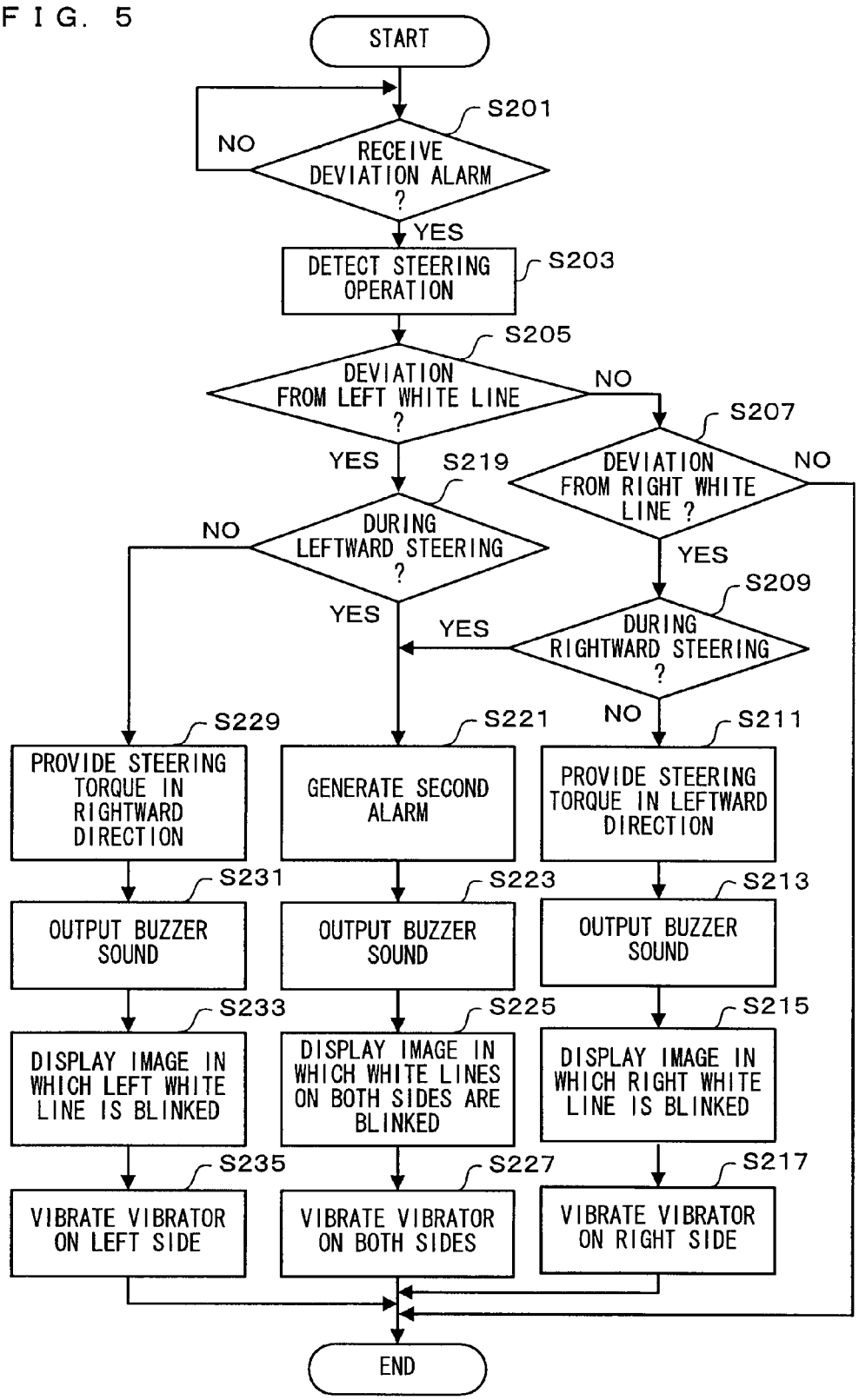
FIG. 5 is a flowchart illustrating one example of an operation of the output adjustment ECU in the situation shown in FIG. 4.

FIG. 5 is a flowchart illustrating one example of an operation of the output adjustment ECU 1 in the situation shown in FIG. 4. In FIG. 4, the case is illustrated where leftward steering is performed by the driver and it is determined by the lane deviation avoidance assist ECU 21 that the possibility of the deviation from the white line on the left side becomes high. In FIG. 5, for convenience, the case is illustrated where a steering operation is performed by the driver and it is determined by the lane deviation avoidance assist ECU 21 that the possibility of a deviation from a white line becomes high.

First, the request reception section 11 determines whether or not a deviation alarm that is an alarm for a deviation from a white line has been received from the lane deviation avoidance assist ECU 21 (S201). When it is determined that the deviation alarm has not been received (NO at S201), the processing enters a standby state. When it is determined that the deviation alarm has been received (YES at S201), the usefulness determination section 12 detects a steering operation performed by the driver, via the steering operation detection sensor 31 (S203). Then, the usefulness determination section 12 determines whether or not the deviation alarm received at step S205 is a deviation alarm for a deviation from the white line on the left side (S205).

When it is determined that the deviation alarm is not the deviation alarm for the deviation from the white line on the left side (NO at S205), the processing proceeds to step S207. When it is determined that the deviation alarm is the deviation alarm for the deviation from the white line on the left side (YES at S205), the usefulness determination section 12 determines whether or not leftward steering is being performed, on the basis of the detection result detected at step S203 (S219). When it is determined that leftward steering is being performed (YES at S219), the processing proceeds to step S221.

When it is determined that leftward steering is not being performed (NO at S219), the processing proceeds to step S229.

In the case of NO at step S205, the usefulness determination section 12 determines whether or not the deviation alarm received at step S205 is a deviation alarm for a deviation from the white line on the right side (S207). When it is determined that the deviation alarm is not the deviation alarm for the deviation from the white line on the right side (NO at S207), the processing ends. When it is determined that the deviation alarm is the deviation alarm for the deviation from the white line on the right side (YES at S207), the usefulness determination section 12 determines whether or not rightward steering is being performed, on the basis of the detection result detected at step S203 (S209). When it is determined that rightward steering is being performed (YES at S209), the processing proceeds to step S221. When it is determined that rightward steering is not being performed (NO at S209), the processing proceeds to step S211.

In the case of NO at step S209, at steps S211 to S217, the output execution section 14 outputs the first alarm information received at step S201. First, the output execution section 14 provides a steering torque in the leftward direction to the steering wheel via the steering torque control ECU 44 (S211). Then, the output execution section 14 outputs a buzzer sound via the speaker 42 (S213). Next, the output execution section 14 displays an image (the middle image of FIG. 6: an image in which the white line on the right side is blinked) representing a deviation from the white line on the right side, via the display 41 (S215). Then, the output execution section 14 provides vibrations (=vibrations of a vibrator on the right side) representing the deviation from the white line on the right side, to the driver via the seat vibrator 43 (S217), and the processing ends.

In the case of NO at step S219, at steps S229 to S235, the output execution section 14 outputs the first alarm information received at step S201. First, the output execution section 14 provides a steering torque in the rightward direction to the steering wheel via the steering torque control ECU 44 (S229). Then, the output execution section 14 outputs a buzzer sound via the speaker 42 (S231). Next, the output execution section 14 displays an image (the lower image of FIG. 6: an image in which the white line on the left side is blinked) representing a deviation from the white line on the left side, via the display 41 (S233). Then, the output execution section 14 provides vibrations (=vibrations of a vibrator on the left side) representing the deviation from the white line on the left side, to the driver via the seat vibrator 43 (S235), and the processing ends.

In the case of YES at step S209 or YES at step S219, the content modification section 13 modifies the first alarm information received at step S201, to generate second alarm information that is alarm information useful for the driver (S221). Then, at steps S223 to S227, the output execution section 14 outputs the second alarm information generated at step S221. First, the output execution section 14 outputs a buzzer sound via the speaker 42 (S223). Next, the output execution section 14 displays an image (the upper image of FIG. 6: an image in which the white lines on both sides are blinked) representing a deviation from a white line, via the display 41 (S225). Then, the output execution section 14 provides vibrations (=vibrations of the vibrators on both sides) representing the deviation from the white line, to the driver via the seat vibrator 43 (S227), and the processing ends.

Figure 6:
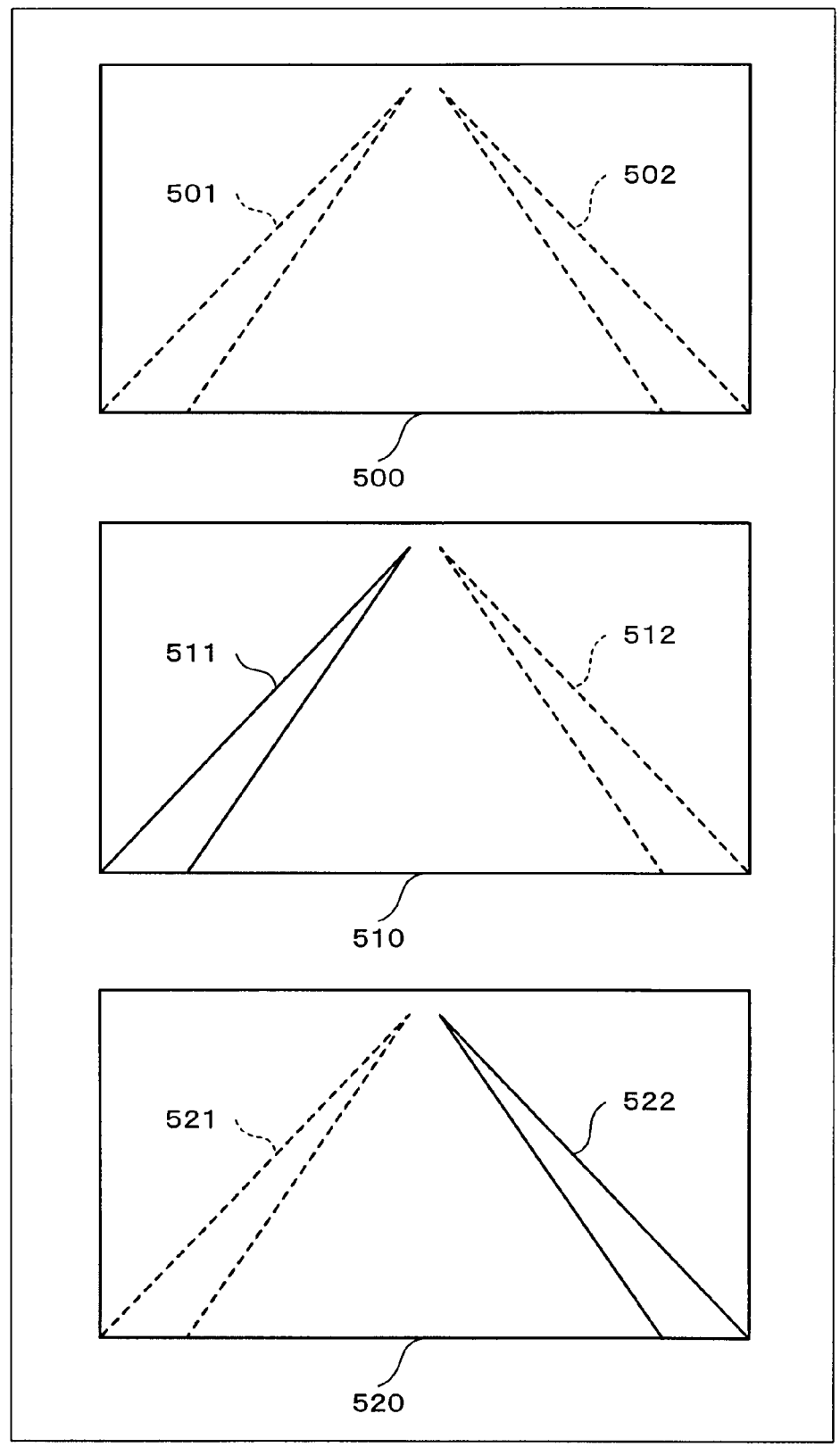
FIG. 6 is a screen diagram illustrating one example of lane deviation alarm screens displayed at step S215 and the like in the flowchart shown in FIG. 5.

FIG. 6 is a screen diagram illustrating one example of lane deviation alarm screens displayed on the display 41 at step S215 and the like in the flowchart shown in FIG. 5. Three lane deviation alarm screens 500, 510, and 520 shown in FIG. 6 are displayed by the output execution section 14 at steps S225, S215, and S233 in the flowchart shown in FIG. 5. The lane deviation alarm screen 500 is an image that includes white line images 501 and 502 displayed on both sides so as to be blinked and that represents a deviation from a white line. The lane deviation alarm screen 510 is an image that includes a white line image 511 displayed continuously on the left side and a white line image 512 displayed on the right side so as to be blinked and that represents a deviation from the white line on the right side. The lane deviation alarm screen 520 is an image that includes a white line image 522 displayed on the left side so as to be blinked and a white line image 522 displayed continuously on the right side and that represents a deviation from the white line on the left side. In other words, the lane deviation alarm screens 500, 510, and 520 are screens representing a deviation from the white line displayed so as to be blinked.

In this manner, when the first request operation that is included in the first alarm information received by the request reception section 11 and that is the operation for making a request to the driver contradicts the driving operation of the driver, the usefulness determination section 12 determines that the first alarm information is not useful. Then, the content modification section 13 modifies the first alarm information to a content that the first request operation does not indicate directivity, and the like, to appropriately modify the first alarm information to generate, as the second alarm information, appropriate alarm information which is outputted. Thus, the appropriate alarm information can be outputted.

Second Embodiment

FIG. 7 is a block diagram illustrating one example of the functional configuration of an output adjustment ECU according to a second embodiment. As shown in FIG. 7, an output adjustment ECU 1A functionally includes a request reception section 11, a usefulness determination section 12A, a content modification section 13A, and an output execution section 14.

It should be noted that the output adjustment ECU 1A causes a microcomputer provided in an appropriate position in the output adjustment ECU 1A to execute a control program previously stored in a ROM (Read Only Memory) or the like provided in an appropriate position in the output adjustment ECU 1A, to cause the microcomputer to functionally operate as functional sections such as the request reception section 11, the usefulness determination section 12A, the content modification section 13A, and the output execution section 14.

The request reception section 11 (corresponding to the request reception unit) and the output execution section 14 (corresponding to the output execution unit) are functional sections that perform the same processes as those of the request reception section 11 and the output execution section 14 of the output adjustment ECU 1 according to the first embodiment, which is shown in FIG. 2, and thus the description thereof is omitted.

The usefulness determination section 12A (corresponding to part of the usefulness determination unit) is a functional section that, when an output request is received by the request reception section 11, determines whether or not outputting first alarm information that is alarm information of which the output request is received is useful for the driver. Specifically, the usefulness determination section 12A determines whether or not the outputting is useful, on the basis of other alarm information that is being outputted from the input apparatus (drive assist ECU) 2.

More specifically, the usefulness determination section 12A determines that the outputting is not useful, when a first request operation that is included in the first alarm information and that is an operation for making a request to the driver contradicts a third request operation that is included in third alarm information and that is an operation for making a request to the driver. In other words, the usefulness determination section 12A determines that the outputting is not useful, when the type of the influence of the first request operation on the traveling state of the vehicle is the same as the type of the influence of the third request operation on the traveling state of the vehicle; and the direction of the influence of the first request operation on the traveling state of the vehicle is opposite to the direction of the influence of the third request operation on the traveling state of the vehicle.

Figure 9:
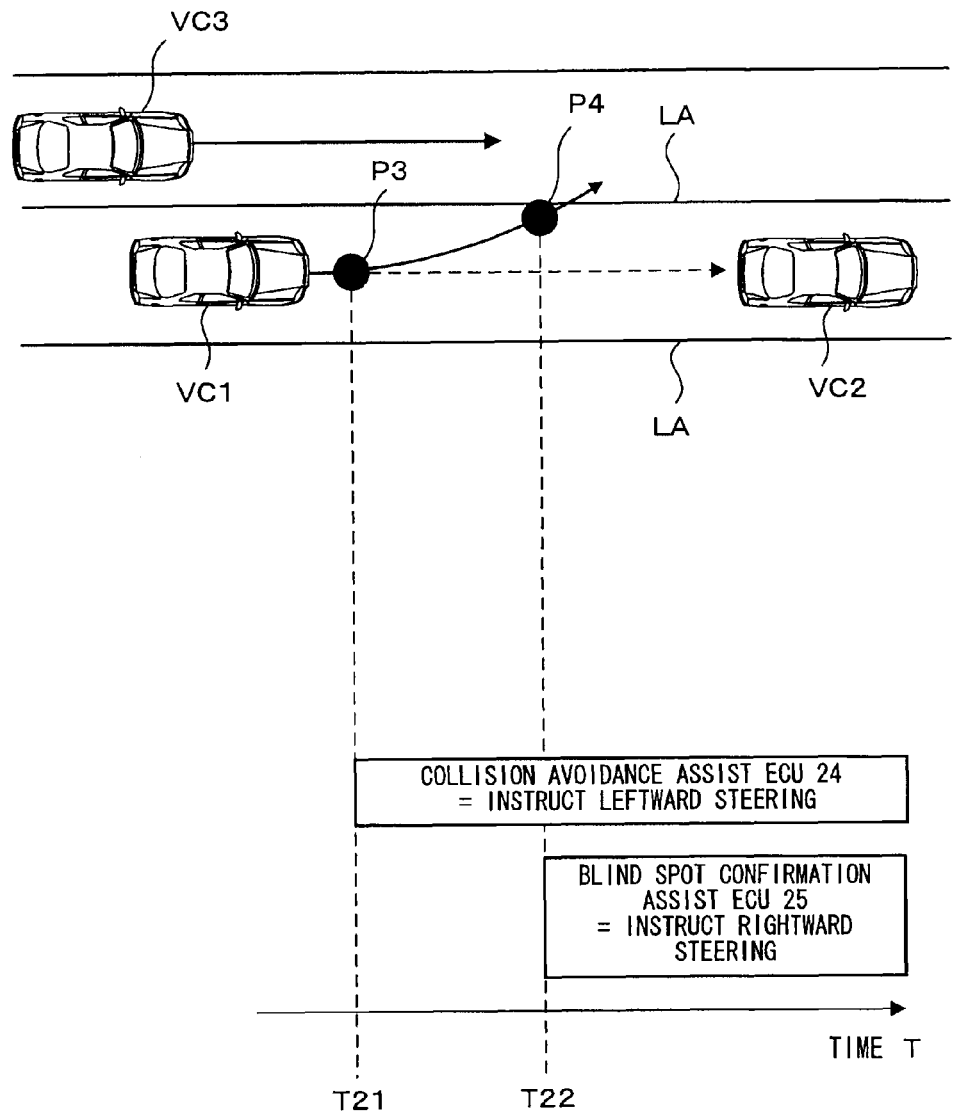
FIG. 9 is an illustration diagram illustrating a first example of a situation where output adjustment of alarm information is performed by the output adjustment ECU according to the second embodiment.

FIG. 9 is an illustration diagram illustrating a first example of a situation where output adjustment of alarm information is performed by the output adjustment ECU 1A according to the second embodiment. The upper diagram of FIG. 9 is a plan view for illustrating the situation, and the lower diagram of FIG. 9 is a timing chart. As shown in the upper diagram of FIG. 9, a vehicle VC1 in which the output adjustment ECU 1 is mounted is traveling toward the right side of the drawing in a lane in which white lines LA are drawn on both sides. In front of the vehicle VC1, a preceding vehicle VC2 is travelling toward the right side of the drawing in the same lane as the lane in which the vehicle VC1 is traveling. In addition, on the left side (the upper side of the drawing) of the lane in which the vehicle VC1 is traveling, there is another lane, and a laterally-traveling vehicle VC3 is traveling in this lane in left rear of the vehicle VC 1 toward the right side of the drawing.

Then, in order to avoid a collision with the preceding vehicle VC2, from time T21 at which the vehicle VC1 reaches a point P3, alarm information including a request operation for prompting leftward steering is outputted by the collision avoidance assist ECU 24. In addition, in order to avoid a collision with the laterally-traveling vehicle VC3, from time T22 at which the vehicle VC1 reaches a point P4, alarm information including a request operation for prompting rightward steering is outputted from the blind spot confirmation assist ECU 25 and received by the request reception section 11.

In other words, in a state where the alarm information (=third alarm information) including the request operation (=third request operation) for prompting leftward steering is outputted from the collision avoidance assist ECU 24, the alarm information (=first alarm information) including the request operation (=rightward steering: first request operation) that contradicts the request operation (=third request operation) being outputted is received. Thus, the usefulness determination section 12A determines that the outputting is not useful.

To be more precise, the type of the influence of the first request operation (=rightward steering) on the traveling state of the vehicle VC1 is change of the traveling direction of the vehicle VC1 and is the same as the type of the influence of the third request operation (=leftward steering) on the traveling state of the vehicle VC1. In addition, the direction of the influence of the first request operation (=rightward steering) on the traveling state of the vehicle VC1 is the rightward direction and is opposite to the direction (=leftward direction) of the influence of the third request operation (=leftward steering) on the traveling state of the vehicle VC1. Therefore, the usefulness determination section 12A determines that the first alarm information including the first request operation is not useful.

In this manner, the usefulness determination section 12A determines whether or not the outputting is useful, on the basis of the third alarm information that is the other alarm information being outputted from the input apparatus (drive assist ECU) 2. Therefore, it can appropriately be determined whether or not the first alarm information is useful for the driver.

In other words, for example, when the first alarm information that is the alarm information of which the output request is received requests the driver to perform an operation that contradicts the third alarm information that is the other alarm information being outputted; and safety is not reduced due to the first alarm information not being outputted, it is appropriately determined that the first alarm information is not useful for the driver.

In the second embodiment, the case is described where the usefulness determination section 12A determines whether or not the outputting is useful, on the basis of the third alarm information that is the other alarm information being outputted. However, the usefulness determination section 12A may determine whether or not the outputting is useful, on the basis of other information instead of (or in addition to) the third alarm information that is the other alarm information being outputted. For example, the usefulness determination section 12A may determine whether or not the outputting is useful, on the basis of the content of a driving operation of the driver and the third alarm information that is the other alarm information being outputted. In this case, it can further appropriately be determined whether or not the outputting is useful.

Further, the usefulness determination section 12A determines that the outputting is not useful, when the first request operation (here, rightward steering) that is included in the first alarm information, which is the alarm information received by the request reception section 11, and that is the operation for making a request to the driver contradicts the third request operation (here, leftward steering) included in the third alarm information that is the other alarm information being outputted from the input apparatus (drive assist ECU) 2. Therefore, it can further appropriately be determined whether or not the first alarm information is useful for the driver.

In other words, for example, it is appropriately determined that the first alarm information including the first request operation is not useful for the driver, when the first request operation (here, rightward steering) that is included in the alarm information, of which the output request is received, and that is the operation for making a request to the driver contradicts the third request operation (here, leftward steering) included in the third alarm information that is the other alarm information being outputted; and safety is not reduced due to the content of the first request operation not being outputted.

In the second embodiment, the case is described where the usefulness determination section 12A determines that the outputting is not useful, when the first request operation contradicts the third request operation. However, it suffices that the usefulness determination section 12A determines whether or not the outputting is useful, on the basis of the third alarm information that is the other alarm information being outputted. For example, the usefulness determination section 12A may determine that the outputting is not useful, also when the first request operation is the same operation as the third request operation included in the third alarm information instead of (or in addition to) when the first request operation contradicts the third request operation included in the third alarm information. In other words, when the first request operation is the same operation as the third request operation included in the third alarm information, the driver has already been requested to perform the same operation as the first request operation, and thus it is determined that the outputting is not useful.

Moreover, as described with reference to FIG. 4, when the type of the influence of the first request operation (here, rightward steering) on the traveling state of the vehicle VC1 is the same (here, change of the traveling direction of the vehicle VC1) as the type of the influence of the third request operation (here, leftward steering) on the traveling state of the vehicle VC1; and the direction (here, the rightward direction) of the influence of the first request operation on the traveling state of the vehicle VC1 is opposite to the direction (here, the leftward direction) of the influence of the third request operation on the traveling state of the vehicle VC1, the usefulness determination section 12A appropriately determines that the first request operation contradicts the driving operation of the driver. Therefore, the usefulness determination section 12A can appropriately determine that the first alarm information is not useful for the driver.

Again referring back to FIG. 7, the functional configuration of the output adjustment ECU 1A will be described. The content modification section 13A (corresponding to the content modification unit) is a functional section that, when the usefulness determination section 12A determines that the outputting is not useful, modifies the content of the first alarm information to generate second alarm information that is alarm information useful for the driver.

Specifically, the content modification section 13A modifies the content of the first request operation that is included in the first alarm information and that is the operation for making a request to the driver, to a content that does not include the direction of the influence of the first request operation on the traveling state of the vehicle, to generate the second alarm information. For example, as described with reference to FIG. 1, vibrations representing a direction for avoiding a collision are provided as a request operation from the blind spot confirmation assist ECU 25. Thus, at time T22 in FIG. 9, instruction information that instructs provision of vibrations (see the upper graph of FIG. 11) prompting rightward steering is outputted from the blind spot confirmation assist ECU 25.

Further, as described with reference to FIG. 9, at time T22, leftward steering is requested from the collision avoidance assist ECU 24 in order to avoid a collision with preceding vehicle VC2. Thus, providing the vibrations prompting rightward steering on the basis of the instruction from the blind spot confirmation assist ECU 25 is not useful for the driver. Therefore, by the content modification section 13A, the first request operation that is the provision of the vibrations prompting rightward steering is modified to vibrations (see the middle graph of FIG. 11) that do not represent any direction.

Moreover, for example, as described with reference to FIG. 1, instruction information that instructs display of an image (see FIG. 12) representing a direction for avoiding a collision with a rear vehicle via the display 41 is outputted as a request operation from the blind spot confirmation assist ECU 25. Thus, at time T22 in FIG. 9, instruction information that instructs display of an image (see the upper drawing of FIG. 12) representing that the direction for avoiding the collision with the rear vehicle is the rightward direction, via the display 41, is outputted from the blind spot confirmation assist ECU 25.

Further, as described with reference to FIG. 9, at time T22, leftward steering is requested from the collision avoidance assist ECU 24 in order to avoid a collision with the preceding vehicle VC2. Thus, displaying the image (see the upper drawing of FIG. 12) representing that the direction for avoiding the collision with the rear vehicle is the rightward direction, via the display 41 on the basis of the instruction from the blind spot confirmation assist ECU 25, is not useful for the driver.

Therefore, the content modification section 13A modifies the display of the image (see the upper drawing of FIG. 12) representing that the direction for avoiding the collision with the rear vehicle is the rightward direction, to display of an image (see the middle drawing of FIG. 12) representing merely the presence of the rear vehicle, to generate second alarm information including this content.

In this manner, the content modification section 13A modifies the first request operation (provision of the vibrations prompting rightward steering and display of the image representing that the direction for avoiding the collision is the rightward direction) included in the first alarm information, to the content that does not include any direction. Thus, the first alarm information is appropriately modified to generate appropriate alarm information as the second alarm information.

In the second embodiment, the case is described where the content modification section 13A modifies the first request operation that is included in the first alarm information and that is the operation for making a request to the driver, to the content that does not include the direction of the influence of the first request operation on the traveling state of the vehicle. However, the content modification section 13A may modify the first alarm information by another method to generate the second alarm information. For example, the content modification section 13A may modify the first request operation to information that a driving state is notified to the driver. In the situation shown in FIG. 9, for example, the content modification section 13A may modify "provision of the vibrations prompting rightward steering", which is the first request operation, to audio information that a driving state, "there is a vehicle in left rear", is notified.

FIG. 8 is a flowchart illustrating one example of an operation of the output adjustment ECU 1A according to the second embodiment. First, the request reception section 11 determines whether or not first alarm information has been received via the drive assist ECU 2 (S301). When it is determined that the first alarm information has not been received (NO at S301), the processing enters a standby state. When it is determined that the first alarm information has been received (YES at S301), the usefulness determination section 12A determines whether or not there is third alarm information that is other alarm information being outputted (S303). When it is determined that there is no third alarm information (NO at S303), the processing proceeds to step S311.

When it is determined that there is the third alarm information (YES at S303), the usefulness determination section 12A extracts a first request operation that is included in the first alarm information received at step S301 and that is an operation for making a request to the driver (S305). Then, the usefulness determination section 12A extracts a third request operation that is included in the third alarm information determined at step S303 to be being outputted and that is an operation for making a request to the driver (S307). Next, the usefulness determination section 12A determines whether or not the first request operation extracted at step S305 contradicts the third request operation extracted at step S307 (S309). When it is determined that the first request operation does not contradict the third request operation (NO at S309), or in the case of NO at step S303, the output execution section 14 outputs the first alarm information received at step S301

(S311). When it is determined that the first request operation contradicts the third request operation (YES at S309), the content modification section 13A modifies the content of the first alarm information received at step S301 to a content that does not include the first request operation included in the first alarm information, and the like, to generate second alarm information that is alarm information useful for the driver (S313). Then, the output execution section 14 outputs the second alarm information generated at step S313 (S315), and the processing ends.

Figure 10:
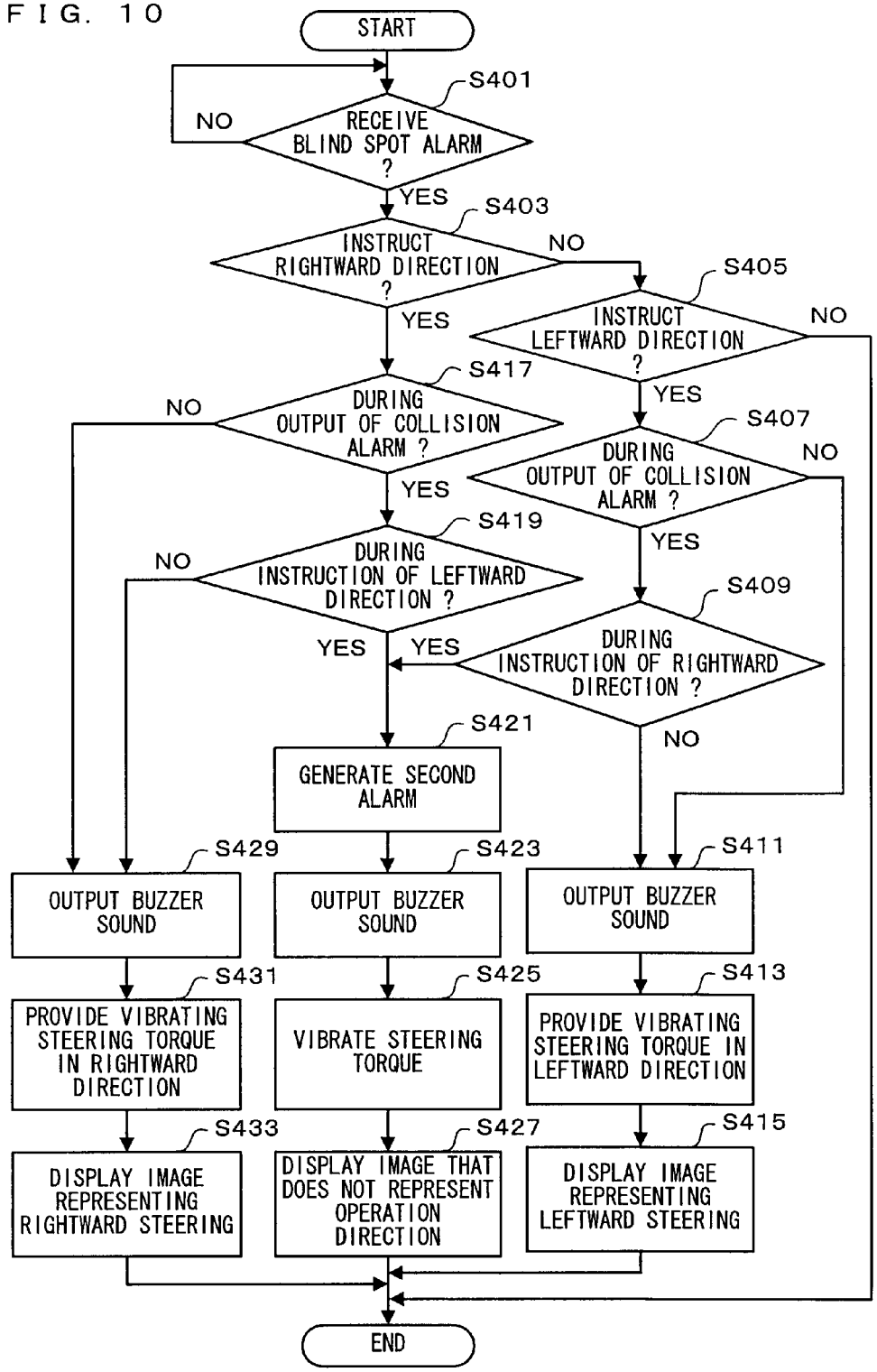
FIG. 10 is a flowchart illustrating one example of an operation of the output adjustment ECU in the situation shown in FIG. 9.

FIG. 10 is a flowchart illustrating one example of an operation of the output adjustment ECU 1A in the situation shown in FIG. 9. In FIG. 9, the case is illustrated where leftward steering is prompted by the collision avoidance assist ECU 24 and rightward steering is prompted by the blind spot confirmation assist ECU 25. In FIG. 10, for convenience, the case is illustrated where a rightward or leftward steering operation is prompted by the collision avoidance assist ECU 24 and a rightward or leftward steering operation is prompted by the blind spot confirmation assist ECU 25.

First, the request reception section 11 determines whether or not a blind spot alarm that is an alarm for preventing an approach to a rear-lateral vehicle during lane change has been received from the blind spot confirmation assist ECU 25 (S401). When it is determined that the blind spot alarm has not been received (NO at S401), the processing enters a standby state. When it is determined that the blind spot alarm has been received (YES at S401), the usefulness determination section 12A determines whether or not the blind spot alarm received at step S401 is a blind spot alarm prompting a rightward steering operation (S403).

When it is determined that the blind spot alarm is not the blind spot alarm prompting the rightward steering operation (NO at S403), the processing proceeds to step S405. When it is determined that the blind spot alarm is the blind spot alarm prompting the rightward steering operation (YES at S403), the usefulness determination section 12A determines whether or not a collision avoidance alarm is being outputted by the collision avoidance assist ECU 24 (S417). When it is determined that the collision avoidance alarm is not being outputted (NO at S417), the processing proceeds to step S429. When it is determined that the collision avoidance alarm is being outputted (YES at S417), the usefulness determination section 12A determines whether or not the collision avoidance alarm is an alarm prompting a leftward steering operation (S419). When it is determined that the collision avoidance alarm is not the alarm prompting the leftward steering operation (NO at S419), the processing proceeds to step S429. When it is determined that the collision avoidance alarm is the alarm prompting the leftward steering operation (YES at S419), the processing proceeds to step S423.

In the case of NO at S403, the usefulness determination section 12A determines whether or not the blind spot alarm is a blind spot alarm prompting a leftward steering operation (S405). When it is determined that the blind spot alarm is not the blind spot alarm prompting the leftward steering operation (NO at S405), the processing ends. When it is determined that the blind spot alarm is the blind spot alarm prompting the leftward steering operation (YES at S405), the usefulness determination section 12A determines whether or not a collision avoidance alarm is being outputted by the collision avoidance assist ECU 24 (S407). When it is determined that the collision avoidance alarm is not being outputted (NO at S407), the processing proceeds to step S411. When it is determined that the collision avoidance alarm is being outputted (YES at S407), the usefulness determination section 12A determines whether or not the collision avoidance alarm is an alarm prompting a rightward steering operation (S409). When it is determined that the collision avoidance alarm is not the alarm prompting the rightward steering operation (NO at S409), the processing proceeds to step S411. When it is determined that the collision avoidance alarm is the alarm prompting the rightward steering operation (YES at S409), the processing proceeds to step S411.

In the case of NO at step S407 or in the case of NO at step S409, at steps S411 to S415, the output execution section 14 outputs the first alarm information received at step S401. First, the output execution section 14 outputs a buzzer sound via the speaker 42 (S411). Next, the output execution section 14 provides vibrations (see the lower graph of FIG. 11) prompting leftward steering, to the steering wheel via the steering torque control ECU 44 (S413). Then, the output execution section 14 displays an image (the lower image of FIG. 12) prompting leftward steering, via the display 41 (S415), and the processing ends.

In the case of NO at step S417 or in the case of NO at step S419, at steps S429 to S433, the output execution section 14 outputs the first alarm information received at step S401. First, the output execution section 14 outputs a buzzer sound via the speaker 42 (S429). Next, the output execution section 14 provides vibrations (see the upper graph of FIG. 11) prompting rightward steering, via the steering torque control ECU 44 (S431). Then, the output execution section 14 displays an image (the upper image of FIG. 12) prompting rightward steering, via the display 41 (S433), and the processing ends.

In the case of YES at step S409 or in the case of YES at step S419, the content modification section 13A modifies the first alarm information received at step S401, to generate second alarm information that is alarm information useful for the driver (S421). Then, at steps S421 to S427, the output execution section 14 outputs the second alarm information generated at step S421. First, the output execution section 14 outputs a buzzer sound via the speaker 42 (S423). Next, the output execution section 14 provides vibrations (see the middle graph of FIG. 11) that do not represent directivity of steering, to the steering wheel via the steering torque control ECU 44 (S425). Then, the output execution section 14 displays an image (the middle image of FIG. 12) that does not represent directivity of steering, via the display 41 (S427), and the processing ends.

Figure 11:
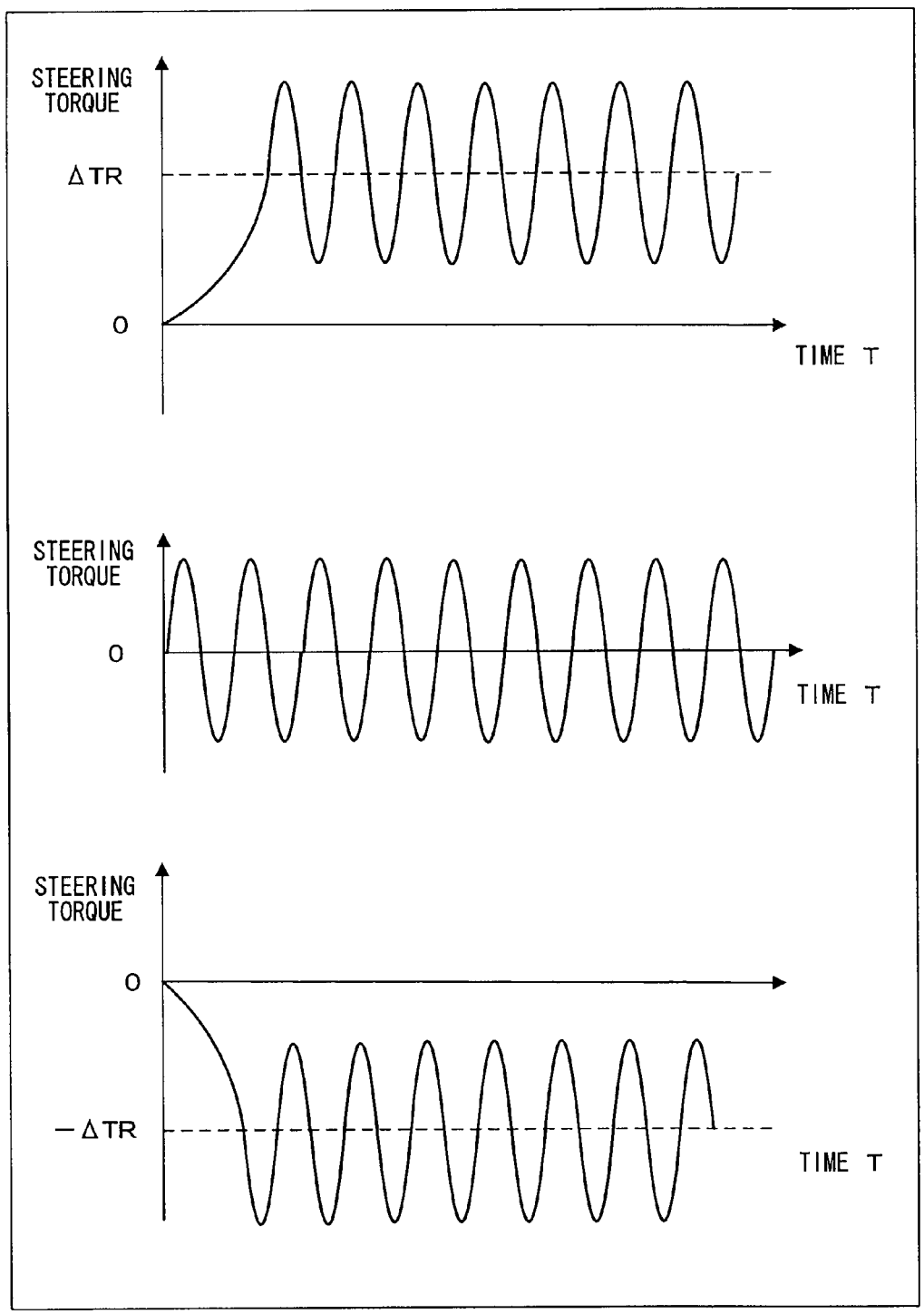
FIG. 11 is graphs illustrating one example of vibrations provided at step S 413 and the like in the flowchart shown in FIG. 10.

FIG. 11 is graphs illustrating one example of vibrations provided at step S 413 and the like in the flowchart shown in FIG. 10. In the drawing, the vertical axis indicates a steering torque provided to the steering wheel, and the horizontal axis indicates time T. Here, with regard to the steering torque provided to the steering wheel, a steering torque that rotates the steering wheel clockwise (=steering torque prompting rightward steering) is defined to have a forward direction.

The three graphs shown in FIG. 11 indicate steering torques provided by the output execution section 14 to the steering wheel via the steering torque control ECU 44 at step S431, S425, S413, respectively, in the flowchart shown in FIG. 10. As shown in the upper graph, the steering torque provided to the steering wheel at step S431 is a torque that vibrates about a steering torque (=steering torque prompting rightward steering) ΔTR that rotates the steering wheel clockwise. As shown in the middle graph, the steering torque provided to the steering wheel at step S425 is a torque that vibrates about "0" and that does not represent directivity. As shown in the lower graph, the steering torque provided to the steering wheel at step S431 is a torque that vibrates about a steering torque (=steering torque prompting leftward steering)−ΔTR that rotates the steering wheel counterclockwise.

Figure 12:
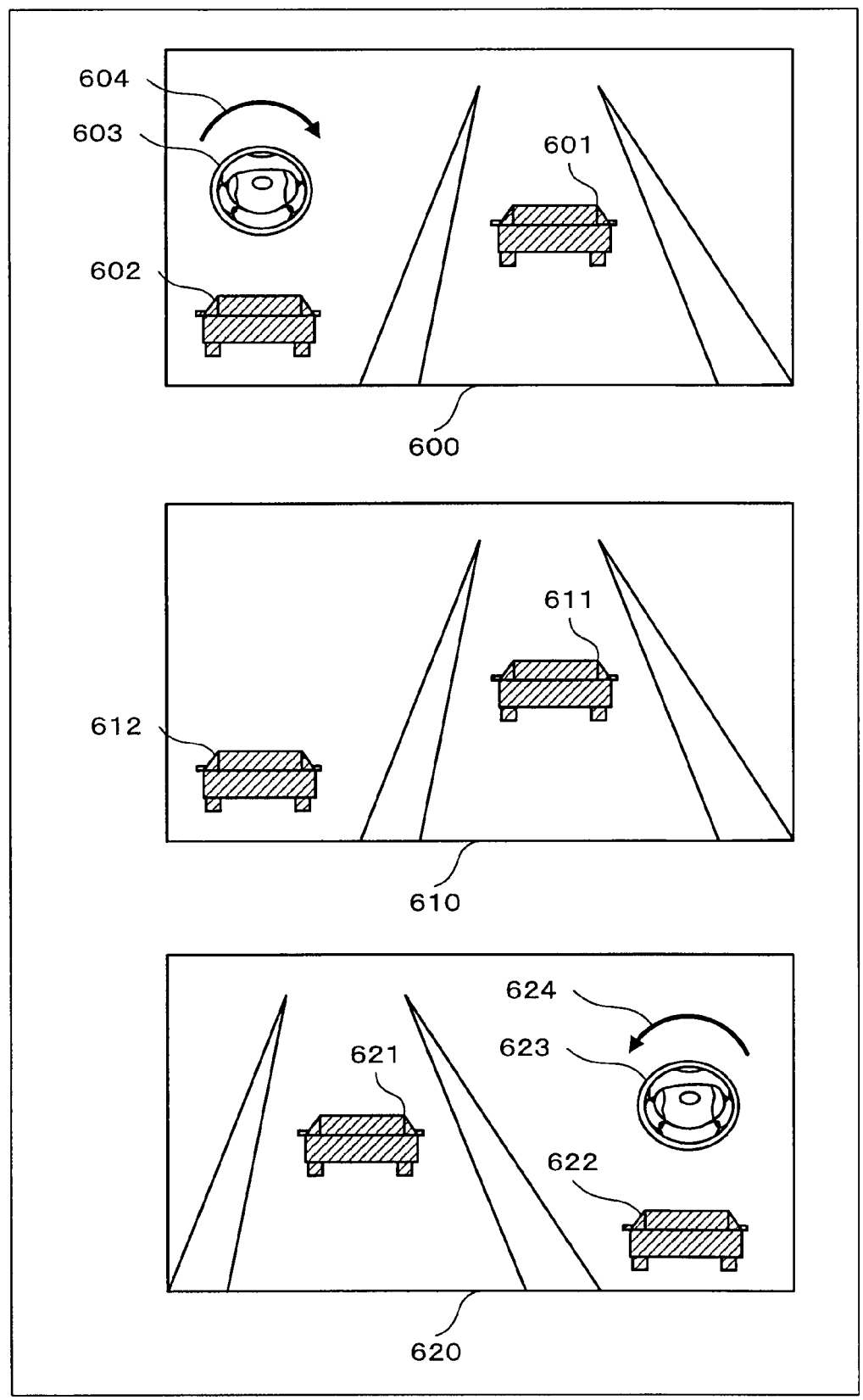
FIG. 12 is a screen diagram illustrating one example of blind spot alarm screens displayed at step S 415 and the like in the flowchart shown in FIG. 10.

FIG. 12 is a screen diagram illustrating one example of blind spot alarm screens displayed at step S415 and the like in the flowchart shown in FIG. 10. Three blind spot alarm screens 600, 610, and 620 shown in FIG. 12 are displayed by the output execution section 14 at step S433, S427, and S415, respectively, in the flowchart shown in FIG. 10. In the blind spot alarm screen 600, an own vehicle image 601 representing the own vehicle VC1, a rear vehicle image 602 representing the vehicle VC3 traveling in left rear, a wheel image 603 representing the steering wheel, and an arrow 604 representing a steering direction, are displayed. The blind spot alarm screen 600 is an image prompting rightward steering by the wheel image 603 and the arrow 604.

In the blind spot alarm screen 610, an own vehicle image 611 representing the own vehicle VC1, and a rear vehicle image 612 representing the vehicle VC3 traveling in left rear are displayed. The blind spot alarm screen 610 does not include the wheel image 603 and the arrow 604 as in the blind spot alarm screen 600, and thus is an image that does not represent a steering direction (=an image that merely represents that there is a vehicle in rear). In the blind spot alarm screen 620, an own vehicle image 621 representing the own vehicle VC1, a rear vehicle image 622 representing a vehicle traveling in right rear, a wheel image 623 representing the steering wheel, and an arrow 624 representing a steering direction, are displayed. The blind spot alarm screen 620 is an image prompting leftward steering by the wheel image 623 and the arrow 624.

In this manner, when the first request operation that is included in the first alarm information received by the request reception section 11 and that is the operation for making a request to the driver contradicts the third request operation included in the third alarm information that is the other alarm information being outputted, the usefulness determination section 12A determines that the first alarm information is not useful. Then, the content modification section 13A modify the first alarm information to a content that the first request operation does not represent directivity, and the like, to appropriately modify the first alarm information to generate, as the second alarm information, appropriate alarm information which is outputted. Thus, the appropriate alarm information can be outputted.

Figure 13:
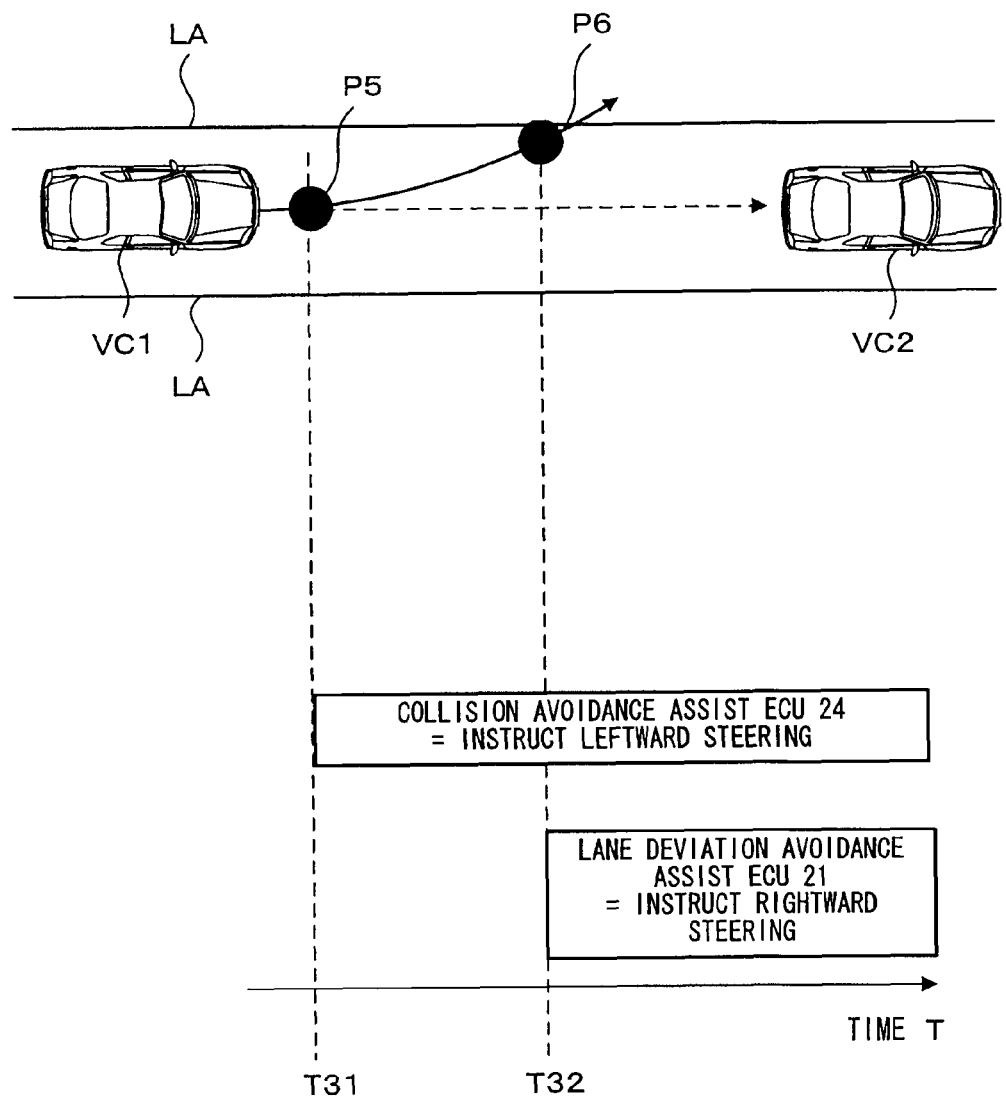
FIG. 13 is an illustration diagram illustrating a second example of the situation where output adjustment of alarm information is performed by the output adjustment ECU according to the second embodiment.

FIG. 13 is an illustration diagram illustrating a second example of the situation where output adjustment of alarm information is performed by the output adjustment ECU 1A according to the second embodiment. The upper diagram of FIG. 3 is a plan view for illustrating the situation, and the lower diagram of FIG. 13 is a timing chart. As shown in the upper diagram of FIG. 13, a vehicle VC1 in which the output adjustment ECU 1 is mounted is traveling toward the right side of the drawing in a lane in which white lines LA are drawn on both sides. In front of the vehicle VC1, a preceding vehicle VC2 is traveling toward the right side of the drawing in the same lane as the lane in which the vehicle VC1 is traveling.

Then, in order to avoid a collision with the preceding vehicle VC2, from time T31 at which the vehicle VC1 reaches a point P3, alarm information including a request operation for prompting leftward steering is outputted by the collision avoidance assist ECU 24. In addition, in order to avoid a deviation from the lane, from time T32 at which the vehicle VC1 reaches a point P6, alarm information including a request operation for prompting rightward steering is outputted from the lane deviation avoidance assist ECU 21 and received by the request reception section 11.

In other words, in a state where the alarm information (=third alarm information) including the request operation (=third request operation) for prompting leftward steering is outputted from the collision avoidance assist ECU 24, the alarm information (=first alarm information) including the request operation (=rightward steering: first request operation) that contradicts the request operation (=third request operation) being outputted is received. Thus, the usefulness determination section 12A determines that the outputting is not useful.

To be more precise, the type of the influence of the first request operation (=rightward steering) on the traveling state of the vehicle VC1 is change of the traveling direction of the vehicle VC1 and is the same as the type of the influence of the third request operation (=leftward steering) on the traveling state of the vehicle VC1. In addition, the direction of the influence of the first request operation (=rightward steering) on the traveling state of the vehicle VC1 is the rightward direction and is opposite to the direction (=leftward direction) of the influence of the third request operation (=leftward steering) on the traveling state of the vehicle VC1. Therefore, the usefulness determination section 12A determines that the first alarm information including the first request operation is not useful.

Further, the content modification section 13A modifies the first alarm information to a content that the first request operation does not represent directivity, and the like, to appropriately modify the first alarm information to generate appropriate alarm information as the second alarm information, and the appropriate alarm information is outputted. Here, as described above with reference to FIG. 1, the first request operation outputted from the lane deviation avoidance assist ECU 21 includes provision of a steering torque in a direction for avoiding a deviation from the lane (here, in the rightward direction), display of an image (here, the lower diagram of FIG. 6) representing the direction of the deviation (here, the leftward direction), and provision of vibrations in the direction of the deviation (here, the leftward direction) to the driver.

Therefore, for example, the content modification section 13A inhibits output of the first request operation that is provision of the steering torque in the direction for avoiding the deviation from the lane (here, the rightward direction), and modifies the first request operation that is display of the image (here, the lower diagram of FIG. 6) representing the direction of the deviation (here, the leftward direction), to display of an image (here, the upper diagram of FIG. 6) that does not represent any direction, and modifies the first request operation that is provision of the vibrations in the direction of the deviation (here, the leftward direction), to provision of vibrations that do not represent any direction, to generate second alarm information.

Figure 14:
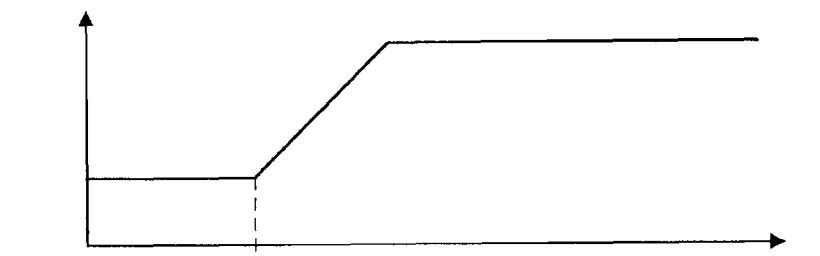
FIG. 14 is an illustration diagram illustrating a third example of the situation where output adjustment of alarm information is performed by the output adjustment ECU according to the second embodiment.
Figure 14:
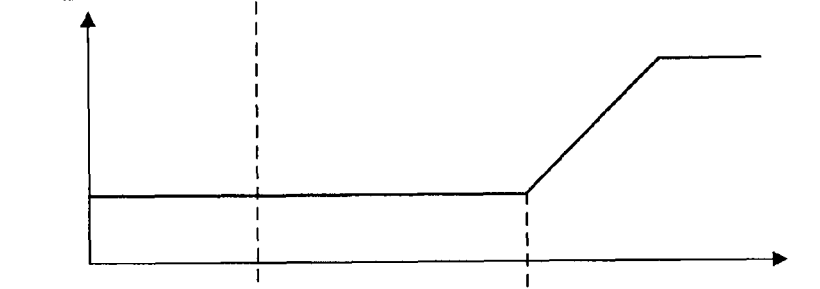
Figure 14:
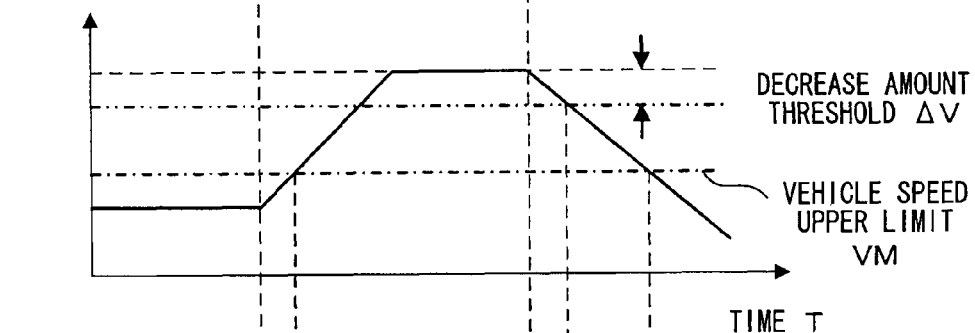

FIG. 14 is an illustration diagram illustrating a third example of the situation where output adjustment of alarm information is performed by the output adjustment ECU 1A according to the second embodiment. In FIG. 14, graphs indicate an accelerator opening, an inclination of a road surface, a vehicle speed V in order from the upper side, and the lower diagram is a timing chart. The horizontal axes of the graphs and the timing chart shown in FIG. 14 all indicate time T. Here, an upper limit VM of a target speed is previously set in the vehicle speed control assist ECU 23 shown in FIG. 1, and a decrease amount threshold AV is previously set in the inclined road speed control assist ECU 26.

As shown in FIG. 14, at time T41, the driver depresses an accelerator in order to accelerate for the purpose of overtaking or the like, and thus the vehicle speed V increases. Then, at time T42, the speed V exceeds the upper limit VM of the target speed, and thus alarm information for preventing an excess over the upper limit vehicle speed is outputted by the vehicle speed control assist ECU 23. Specifically, as described above with reference to FIG. 1, instruction information that instructs display of an image (see FIG. 15) representing an excess over the upper limit of the target speed, via the display 41, and instruction information that instructs output of a buzzer sound drawing the driver's attention via the speaker 42, are outputted by the vehicle speed control assist ECU 23.

Then, at time T43, the road surface becomes an upward slope, and thus the vehicle speed V starts to decrease. Next, at time T44, the decrease amount of the speed V exceeds the decrease amount threshold ΔV, and thus output of alarm information for preventing deceleration caused by the inclination of the road surface or the like and that is against an intention is requested by the inclined road speed control assist ECU 26. Specifically, as described above with reference to FIG. 1, instruction information that instructs display of an image (see FIG. 15) drawing attention to the decrease in speed, via the display 41, and instruction information that instructs output of a voice prompting speed maintenance (e.g., "please drive while maintaining speed"), via the speaker 42, are outputted by the inclined road speed control assist ECU 26 to the output adjustment ECU 1.

In other words, in a state where alarm information (=third alarm information) including a request operation (=third request operation) for prompting deceleration is outputted from the vehicle speed control assist ECU 23, alarm information (=first alarm information) including a request operation (=maintaining speed: first request operation) that contradicts the request operation (=third request operation) being outputted is received. Thus, the usefulness determination section 12A determines that the outputting is not useful.

To be more precise, the type of the influence of the first request operation (=maintaining speed) on the traveling state of the vehicle VC1 is change of the traveling speed of the vehicle VC1 and is the same as the type of the influence of the third request operation (=deceleration) on the traveling state of the vehicle VC1. In addition, the direction of the influence of the first request operation (=maintaining speed) on the traveling state of the vehicle VC1 is maintenance and contradicts the direction (=deceleration) of the influence of the third request operation (=deceleration) on the traveling state of the vehicle VC1. Therefore, the usefulness determination section 12A determines that the first alarm information including the first request operation is not useful.

Further, the content modification section 13A modifies the first alarm information to a content that the first request operation does not represent directivity, and the like, to appropriately modify the first alarm information to generate appropriate alarm information as the second alarm information, and the appropriate alarm information is outputted. Here, as described above with reference to FIG. 1, the first request operation outputted from the inclined road speed control assist ECU 26 includes output of a voice prompting speed maintenance (e.g., "please drive while maintaining speed").

Therefore, for example, the content modification section 13A modifies the first request operation that is output of the voice prompting speed maintenance (e.g., "please drive while maintaining speed"), to audio information that does not represent any direction (e.g., "please be careful about speed"), to generate second alarm information.

Figure 15:
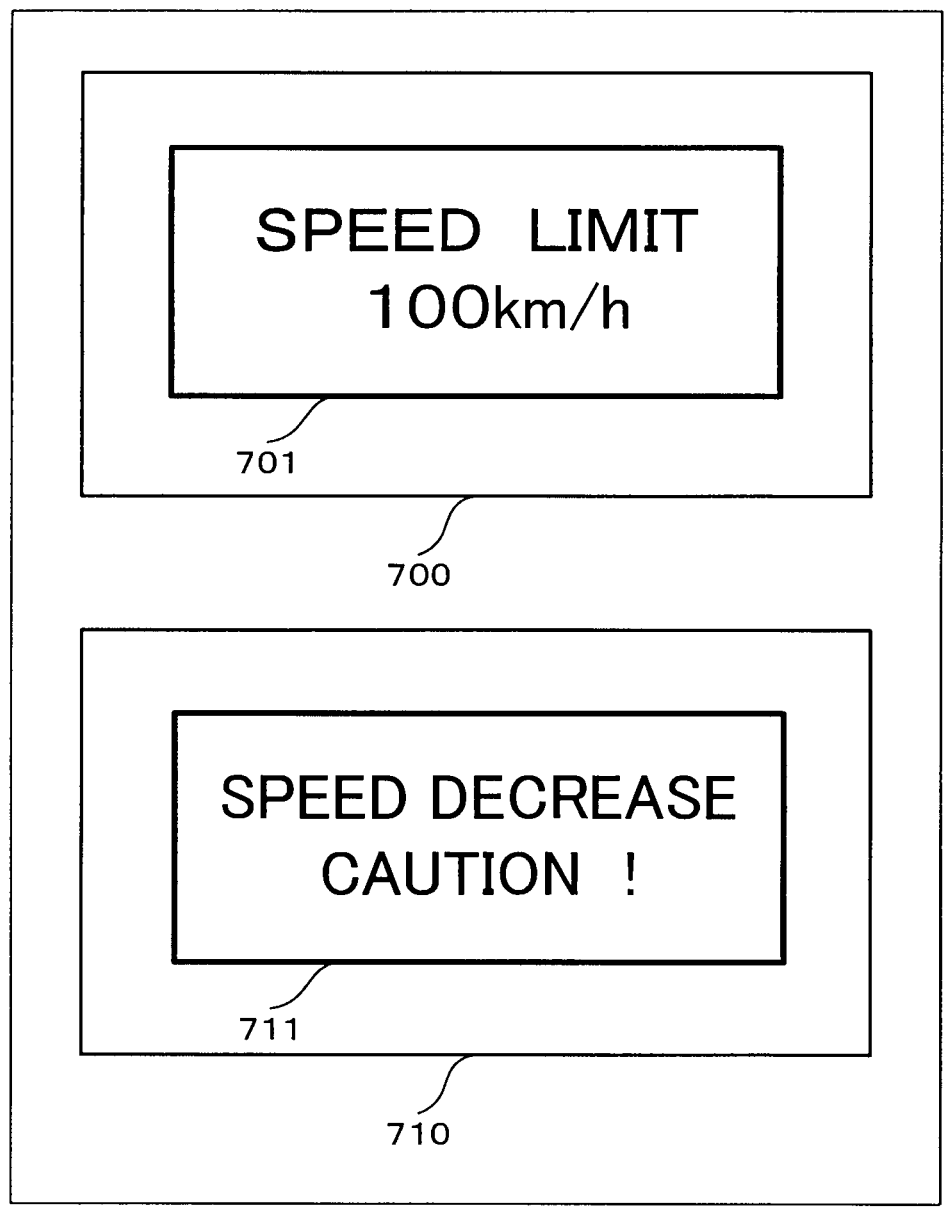
FIG. 15 is a screen diagram illustrating one example of a vehicle speed alarm screen and a vehicle speed decrease alarm screen that are displayed in the situation shown in FIG. 14.

FIG. 15 is a screen diagram illustrating one example of a vehicle speed alarm screen and a vehicle speed decrease alarm screen displayed in the situation shown in FIG. 14. In a vehicle speed alarm screen 700 shown on the upper side of FIG. 15, a vehicle speed alarm display portion 701 for displaying character information representing an excess over the upper limit of the target speed (here, "SPEED LIMIT 100 km/h") is displayed. In addition, in a vehicle speed decrease alarm screen 710 shown on the lower side of FIG. 15, a speed decrease alarm display portion 711 for displaying character information drawing attention to a decrease in speed (here, "SPEED DECREASE CAUTION!") is displayed.

In this manner, according to the output adjustment ECU 1 according to the first embodiment and the output adjustment ECU 1A according to the second embodiment, when it is determined that the first alarm information that is the alarm information of which the output request is received is not useful for the driver, the content of the first alarm information is modified to generate second alarm information that is alarm information useful for the driver, and the second alarm information is outputted. Thus, alarm information that is not useful for the driver is not outputted, and hence appropriate alarm information can be outputted.

The alarm output control apparatus according to the present invention is not limited to the first embodiment and the second embodiment, and the following embodiments may be implemented.

(A) In the first embodiment, the case has been described where the output adjustment ECU 1 functionally includes the request reception section 11, the usefulness determination section 12, the content modification section 13, and the output execution section 14. However, at least one functional section among the request reception section 11, the usefulness determination section 12, the content modification section 13, and the output execution section 14 may be implemented by hardware such as an electric circuit.

Similarly, in the second embodiment, the case has been described where the output adjustment ECU 1A functionally includes the request reception section 11, the usefulness determination section 12A, the content modification section 13A, and the output execution section 14. However, at least one functional section among the request reception section 11, the usefulness determination section 12A, the content modification section 13A, and the output execution section 14 may be implemented by hardware such as an electric circuit.

(B) In the first embodiment and the second embodiment, the case has been described where the output execution section 14 outputs the first alarm information and the second alarm information via audio information, character information, and image information. However, it suffices that the output execution section 14 outputs the first alarm information and the second alarm information via at least one of audio information, character information, and image information.

(C) In the first embodiment and the second embodiment, the case has been described where the output execution section 14 outputs the first alarm information and the second alarm information via provision of vibrations to the steering wheel and the driver. However, it suffices that the output execution section 14 outputs the first alarm information and the second alarm information via provision of vibrations to at least either one of the steering wheel or the driver.

(D) In the first embodiment and the second embodiment, the case has been described where the output execution section 14 outputs the first alarm information and the second alarm information via provision of vibrations to the steering wheel. However, the output execution section 14 may output the first alarm information and the second alarm information via provision of vibrations to another operation unit (e.g., an accelerator pedal) operated by the driver.

INDUSTRIAL APPLICABILITY

The present invention is applicable to, for example, an alarm output control apparatus that is mounted in a vehicle and that controls output of alarm information from at least one drive assist apparatus to a driver.

The invention claimed is:

1. A drive support system that is mounted in a vehicle, the drive support system comprising:
   a generation unit to generate first alarm information which prompts a driver to perform a steering operation influencing a traveling state of the vehicle;
   an output unit to output the generated first alarm information to the driver; and
   an operation detecting unit to detect a steering direction by the driver, wherein
   when the steering operation requested for the driver does not contradict the steering direction by the driver, the first alarm information is outputted from the output unit, and
   when the steering operation requested for the driver contradicts the steering direction by the driver, second alarm information that does not influence the traveling state of the vehicle and that notifies the driver of a driving state is outputted from the output unit.

2. The drive support system according to claim 1, further comprising a control unit to control the output from the output unit to the driver, wherein
   the control unit, when the steering operation requested for the driver does not contradict the steering direction by the driver, causes the output unit to output the first alarm information, and when the steering operation requested for the driver contradicts the steering direction by the driver, modifies the first alarm information to the second alarm information that does not influence the traveling state of the vehicle and that notifies the driver of the driving state, and causes the output unit to output the second alarm information.

3. The drive support system according to claim 1, wherein the traveling state is a traveling direction.

4. The drive support system according to claim 1, wherein the first alarm information is at least any one of providing a steering torque in a direction for avoiding a deviation from a lane, displaying a direction of the deviation from the lane in an image, and providing vibrations in the direction of the deviation from the lane, to the driver.

5. The drive support system according to claim 4, wherein the second alarm information is at least either one of displaying an image representing the deviation from the lane or providing vibrations representing the deviation from the lane, to the driver.

6. The drive support system according to claim 1, wherein the first alarm information includes other alarm information that does not influence the traveling state of the vehicle.

7. The drive support system according to claim 6, wherein the other alarm information draws driver's attention with a buzzer sound to notify of a deviation from a lane.

8. A drive support system that is mounted in a vehicle, the drive support system comprising:
   a generation unit to generate
     first alarm information including: alarm information which prompts a driver to perform a steering operation influencing a traveling state of the vehicle; and
     other alarm information that does not influence the traveling state of the vehicle;
   an output unit to output the generated first alarm information to the driver; and
   an operation detecting unit to detect a steering direction by the driver, wherein
   when a direction of influence of the steering operation requested for the driver on the traveling state of the vehicle is the same, with regard to whether rightward or leftward, as a direction of influence of a steering operation performed by the driver on the traveling state of the vehicle, the first alarm information is outputted from the output unit, and
   when a direction of influence of the steering operation requested for the driver on the traveling state of the vehicle is not the same, with regard to whether rightward or leftward, as a direction of influence of a steering operation performed by the driver on the traveling state of the vehicle, the other alarm information that does not include the alarm information which prompts the driver to perform the steering operation requested for the driver is outputted from the output unit.

9. The drive support system according to claim 8, further comprising a control unit to control the output from the output unit to the driver, wherein
   the control unit,
   when a direction of influence of the steering operation requested for the driver on the traveling state of the vehicle is the same, with regard to whether rightward or leftward, as a direction of influence of a steering operation performed by the driver on the traveling state of the vehicle, causes the output unit to output the first alarm information, and
   when a direction of influence of the steering operation requested for the driver on the traveling state of the vehicle is not the same, with regard to whether rightward or leftward, as a direction of influence of a steering operation performed by the driver on the traveling state of the vehicle, causes the output unit to output the other alarm information that does not include the alarm information which prompts the driver to perform the steering operation requested for the driver.

10. A drive support system that is mounted in a vehicle, the drive support system comprising:
    a controller configured to output first alarm information which prompts a driver to perform a steering operation influencing a traveling state of the vehicle to the driver; and
    an operation detector to detect a steering direction by the driver, wherein
    when the steering operation requested for the driver does not contradict the steering direction by the driver, the controller is configured to output the first alarm information, and
    when the steering operation requested for the driver contradicts the steering direction by the driver, the controller is configured to output second alarm information that does not influence the traveling state of the vehicle and that notifies the driver of a driving state.

11. The drive support system according to claim 10, wherein
    the controller is configured to,
    when the steering operation requested for the driver does not contradict the steering direction by the driver, output the first alarm information, and
    when the steering operation requested for the driver contradicts the steering direction by the driver, modify the first alarm information to the second alarm information that does not influence the traveling state of the vehicle and that notifies the driver of the driving state, and output the second alarm information.

12. The drive support system according to claim 10, wherein the traveling state is a traveling direction.

13. The drive support system according to claim 10, wherein the first alarm information is at least any one of providing a steering torque in a direction for avoiding a deviation from a lane, displaying a direction of the deviation from the lane in an image, and providing vibrations in the direction of the deviation from the lane, to the driver.

14. The drive support system according to claim 13, wherein the second alarm information is at least either one of displaying an image representing the deviation from the lane or providing vibrations representing the deviation from the lane, to the driver.

15. The drive support system according to claim 10, wherein the first alarm information includes other alarm information that does not influence the traveling state of the vehicle.

16. The drive support system according to claim 15, wherein the other alarm information draws driver's attention with a buzzer sound to notify of a deviation from a lane.

17. A method of operating a drive support system that is mounted in a vehicle, comprising:
- outputting, with a controller, first alarm information which prompts a driver to perform a steering operation influencing a traveling state of the vehicle to the driver; and
- detecting, with an operation detector, a steering direction by the driver, wherein
- when the steering operation requested for the driver does not contradict the steering direction by the driver, outputting the first alarm information with the controller, and
- when the steering operation requested for the driver contradicts the steering direction by the driver, outputting second alarm information that does not influence the traveling state of the vehicle and that notifies the driver of a driving state with the controller.

* * * * *